US007739816B2

(12) United States Patent
Kowatari

(10) Patent No.: US 7,739,816 B2
(45) Date of Patent: Jun. 22, 2010

(54) SELF-STANDING FLAT PLATE-LIKE ARTICLE AND METHODS OF EXHIBITING AND MANUFACTURING THE SAME

(75) Inventor: Akira Kowatari, Fuchu (JP)

(73) Assignee: Ferric Inc., Tokyo (JP)

( * ) Notice: Subject to any disclaimer, the term of this patent is extended or adjusted under 35 U.S.C. 154(b) by 0 days.

(21) Appl. No.: 11/665,872

(22) PCT Filed: Jan. 30, 2006

(86) PCT No.: PCT/JP2006/001413

§ 371 (c)(1),
(2), (4) Date: Apr. 19, 2007

(87) PCT Pub. No.: WO2007/013197

PCT Pub. Date: Feb. 1, 2007

(65) Prior Publication Data

US 2007/0295677 A1 Dec. 27, 2007

(30) Foreign Application Priority Data

Jul. 29, 2005 (JP) ............................ 2005-219909
Oct. 21, 2005 (JP) ............................ 2005-306845

(51) Int. Cl.

*G06F 1/00* (2006.01)
*A47G 1/06* (2006.01)
*A47G 23/02* (2006.01)
*A47B 97/04* (2006.01)
*A47J 47/16* (2006.01)

(52) U.S. Cl. .............. 40/124.09; 40/124.17; 40/124.18; 40/124.11; 40/124.05; 40/124.19; 40/124.13; 40/124; 40/124.01; 40/788; 40/789; 248/152; 248/459; 248/174

(58) Field of Classification Search ................................ 40/124.01–124.191, 788, 789; 248/152, 248/459

See application file for complete search history.

(56) References Cited

U.S. PATENT DOCUMENTS 2,241,075 A * 5/1941 Sunderhau et al. .......... 248/152
(Continued)

FOREIGN PATENT DOCUMENTS

JP H05-93784 U 11/1993
(Continued)

OTHER PUBLICATIONS

Patent Abstracts of Japan, Publication No. 2004-313693 dated Nov. 11, 2004 (2 pages).
(Continued)

*Primary Examiner*—Lesley Morris
*Assistant Examiner*—Syed A Islam
(74) *Attorney, Agent, or Firm*—Osha • Liang LLP

(57) ABSTRACT

A method for stably and easily exhibiting a flat plate-like article such as a flat exhibited article so as to be easily observed and less turned over and the flat plate-like article stably and simply exhibitable so as to be easily observed and less turned over and manufacturable at low cost. The flat plate-like article comprises two or more flat plate-like members and one or more connection parts. The flat plate-like article is characterized in that (A) any first and second flat plate-like members are connected to each other through the connection part and positioned on the border line of these both members and projected backward from the border line so that they can be double-spread and (B) the flat plate-like article can be self-stood when the first and second flat plate-like members are brought into a double-spread state so that a state that the insides of the first and second flat plate-like members are positioned diagonally upward relative to a ground contact surface when at least a part of the bottom-side of the connection part, at least a part of the bottom-side of the first flat plate-like member, and at least a part of the bottom-side of the second flat plate-like member are used as the ground contact parts.

19 Claims, 19 Drawing Sheets

U.S. PATENT DOCUMENTS

| | | | | |
|---|---|---|---|---|
| 2,587,316 | A | 2/1952 | Henry | |
| 4,965,946 | A * | 10/1990 | Hegedus et al. | 40/124.4 |
| 5,359,793 | A * | 11/1994 | Copperstone | 40/124.09 |

FOREIGN PATENT DOCUMENTS

| | | | |
|---|---|---|---|
| JP | 3009671 | | 4/1995 |
| JP | 07-148056 | | 6/1995 |
| JP | H07-313233 | A | 12/1995 |
| JP | 09-276104 | | 10/1997 |
| JP | 10-236033 | | 9/1998 |
| JP | 2000-071662 | | 3/2000 |
| JP | 2000-218968 | | 8/2000 |
| JP | 2000-327377 | | 11/2000 |
| JP | 2001-162969 | A | 6/2001 |
| JP | 2002-515983 | | 5/2002 |
| JP | 2004-033662 | | 2/2004 |
| JP | 2004-313693 | | 11/2004 |
| JP | 2005-107016 | | 4/2005 |
| JP | 2005-205146 | A | 8/2005 |
| NL | 1 024 255 | C2 | 3/2005 |

OTHER PUBLICATIONS

Patent Abstracts of Japan, Publication No. 2000-218968 dated Aug. 8, 2000 (2 pages).
Patent Abstracts of Japan, Publication No. 2005-107016 dated Apr. 21, 2005 (2 pages).
International Search Report issued in PCT/JP2006/301413 mailed on May 2, 2006, with translation (4 pages).
Microfilm of the specification and drawings annexed to the request of Japanese Utility Model Application No. 62673/1989 (Laid-open No. 869/1991 (Akira Haraoka), Jan. 8, 1991.
Microfilm of the specification and drawings annexed to the request of Japanese Utility Model Application No. 204701/1983 (Laid-open No. 106761/1985) (Masao Nakasawa), Jul. 20, 1985.
Patent Abstracts of Japan, Publication No. 07-148056 dated Jun. 13, 1995 (2 pages).
Patent Abstracts of Japan, Publication No. 10-236033 dated Sep. 8, 1998 (2 pages).
Patent Abstracts of Japan, Publication No. 2000-327377 dated Nov. 28, 2000 (2 pages).
Patent Abstracts of Japan, Publication No. 2004-033662 dated Feb. 5, 2004 (2 pages).
Patent Abstracts of Japan, Publication No. 2000-071662 dated Mar. 7, 2000 (2 pages).
Japanese Utility Model Application Publication No. H03-869 (Akira Haraoka), Jan. 8, 1991, with English translation (2 pages).
Japanese Utility Model Application Publication No. 60-106761 (Masao Nakasawa), Jul. 20, 1985, with English translation (3 pages).
Patent Abstracts of Japan, Publication No. 2004-313693 dated Nov. 11, 2004 (2 pages).
Patent Abstracts of Japan, Publication No. 2000-218968 dated Aug. 8, 2000 (2 pages).
Patent Abstracts of Japan, Publication No. 2005-107016 dated Apr. 21, 2005 (2 pages).
Patent Abstracts of Japan, Publication No. 09-276104 dated Oct. 28, 1997 (1 page).
Japanese Utility Model Application Publication No. H03-869 (Akira Haraoka), Jan. 8, 1991, with English translation (2 pages).
Japanese Utility Model Application Publication No. 60-106761 (Masao Nakasawa), Jul. 20, 1985, with English translation (3 pages).
Japanese Utility Model Application Publicatoin No. 3009671 (Ugawa Kaku), Apr. 11, 1995, with English translation (5 pages).
Extended European Search Report issued Apr. 29, 2009, by the European Patent Office in European Patent Application No. EP-06712556.7—1231 (11 pages).
Office Action issued Sep. 3, 2009, by the European Patent Office in related European Patent Application No. EP-06712556.7-1231/1912197 (1 page).
Patent Abstracts of Japan, Publication No. 2000-218968 dated Aug. 8, 2000 (2 pages).

* cited by examiner

[FIG.1]
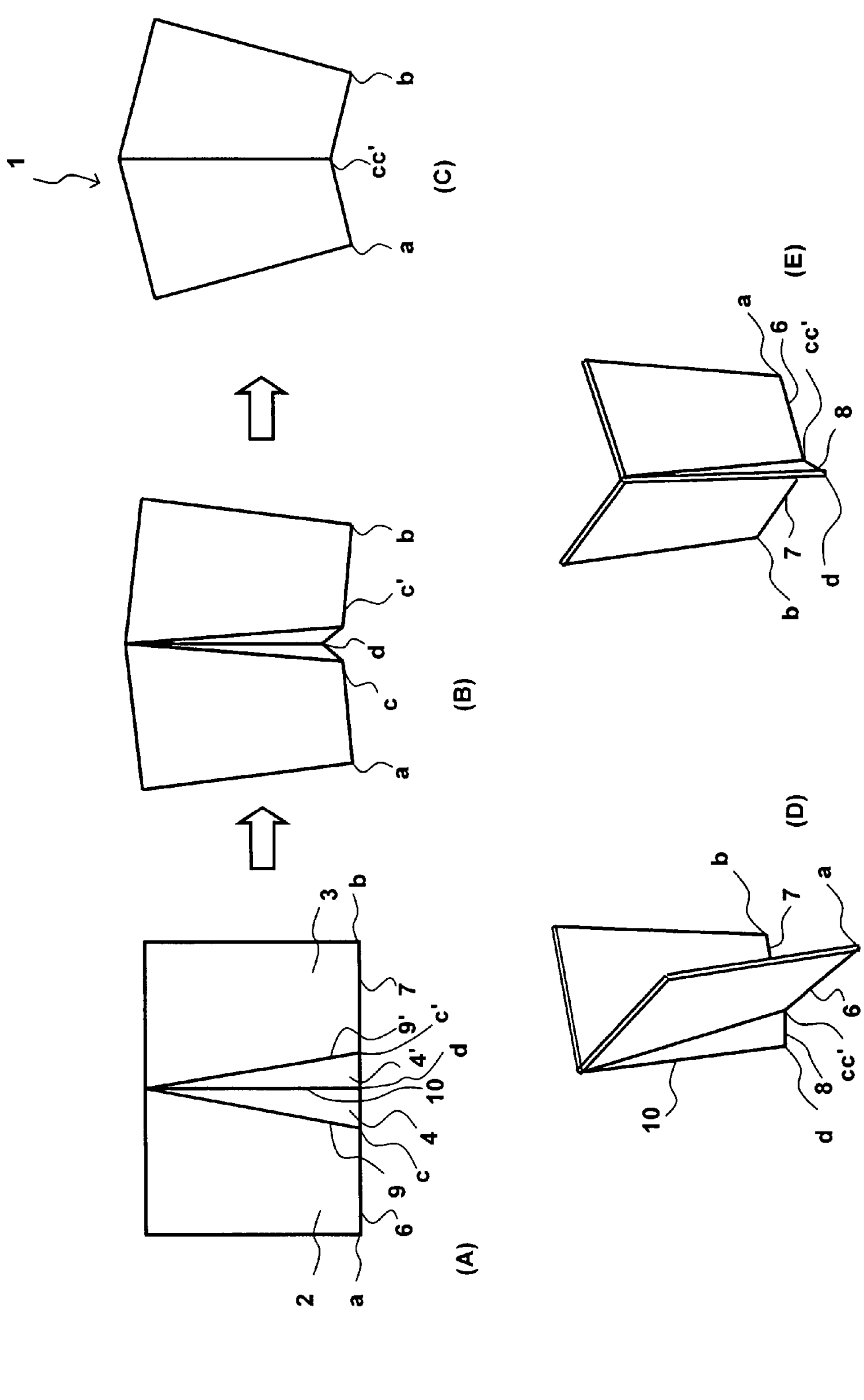

[FIG.2]
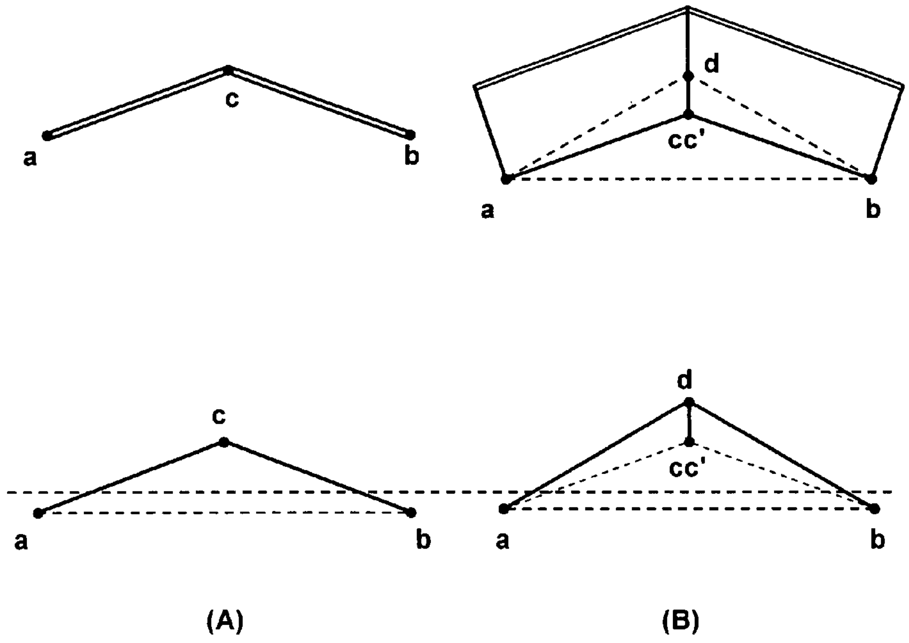

[FIG.3]
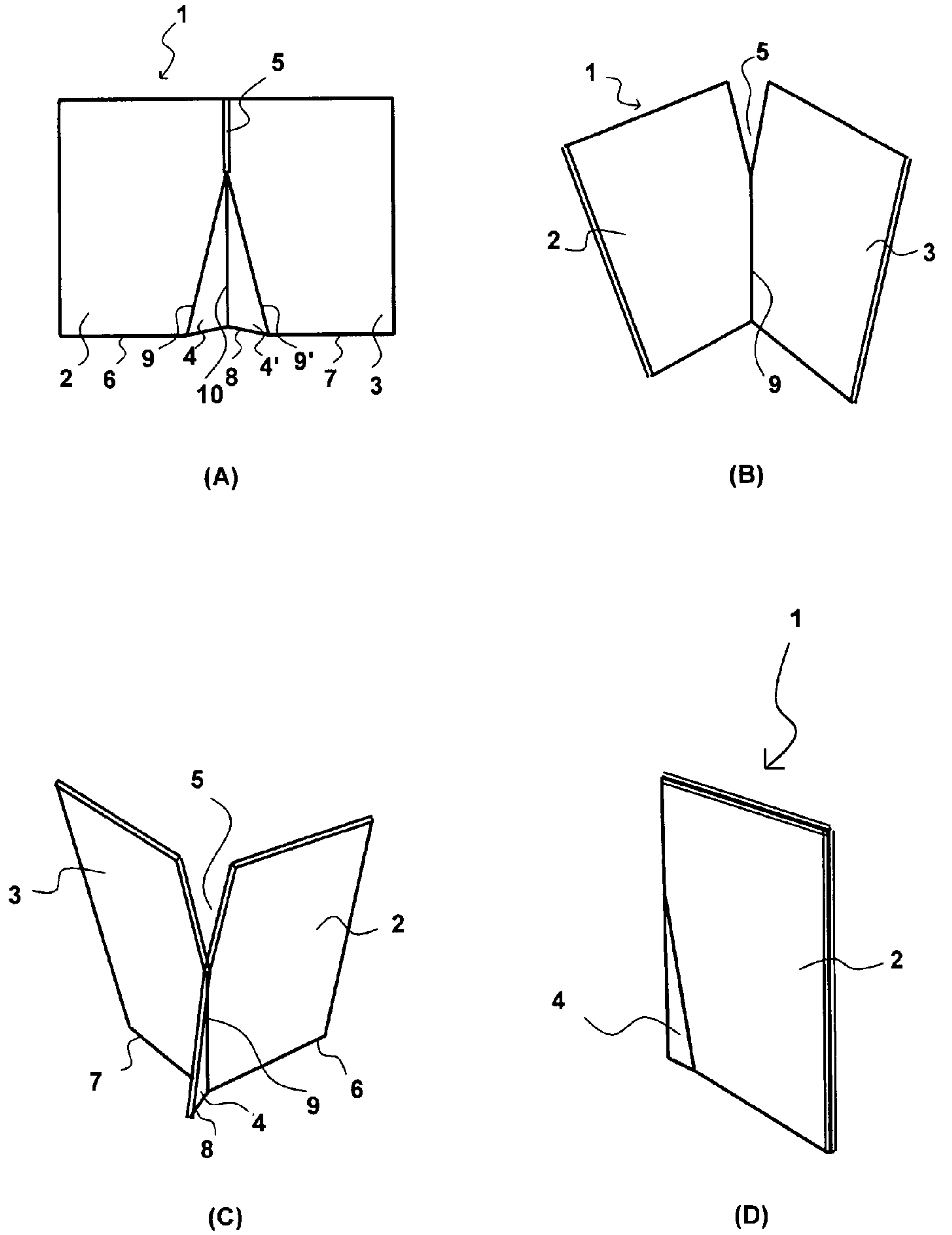

[FIG.4]
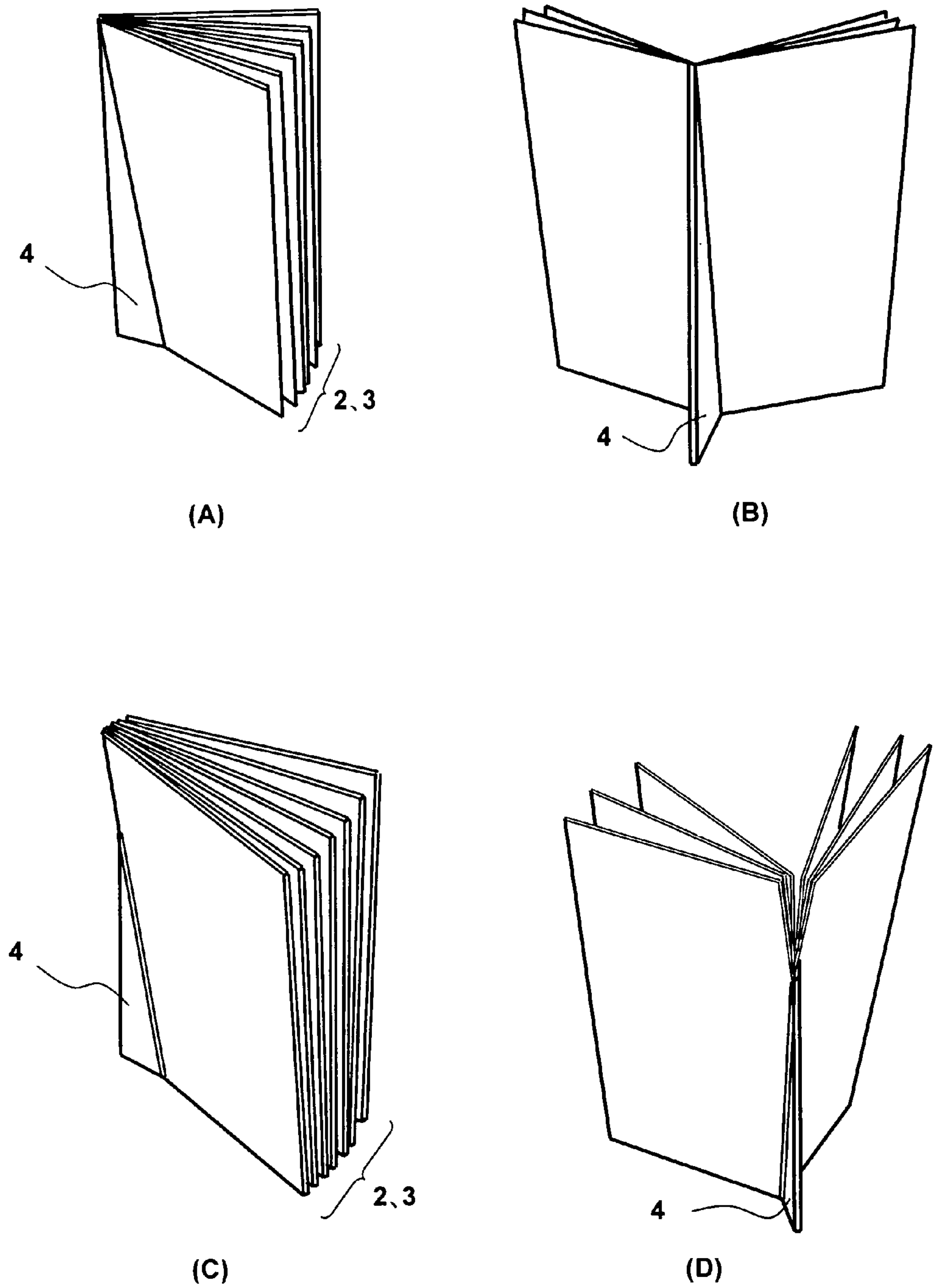

[FIG.5]
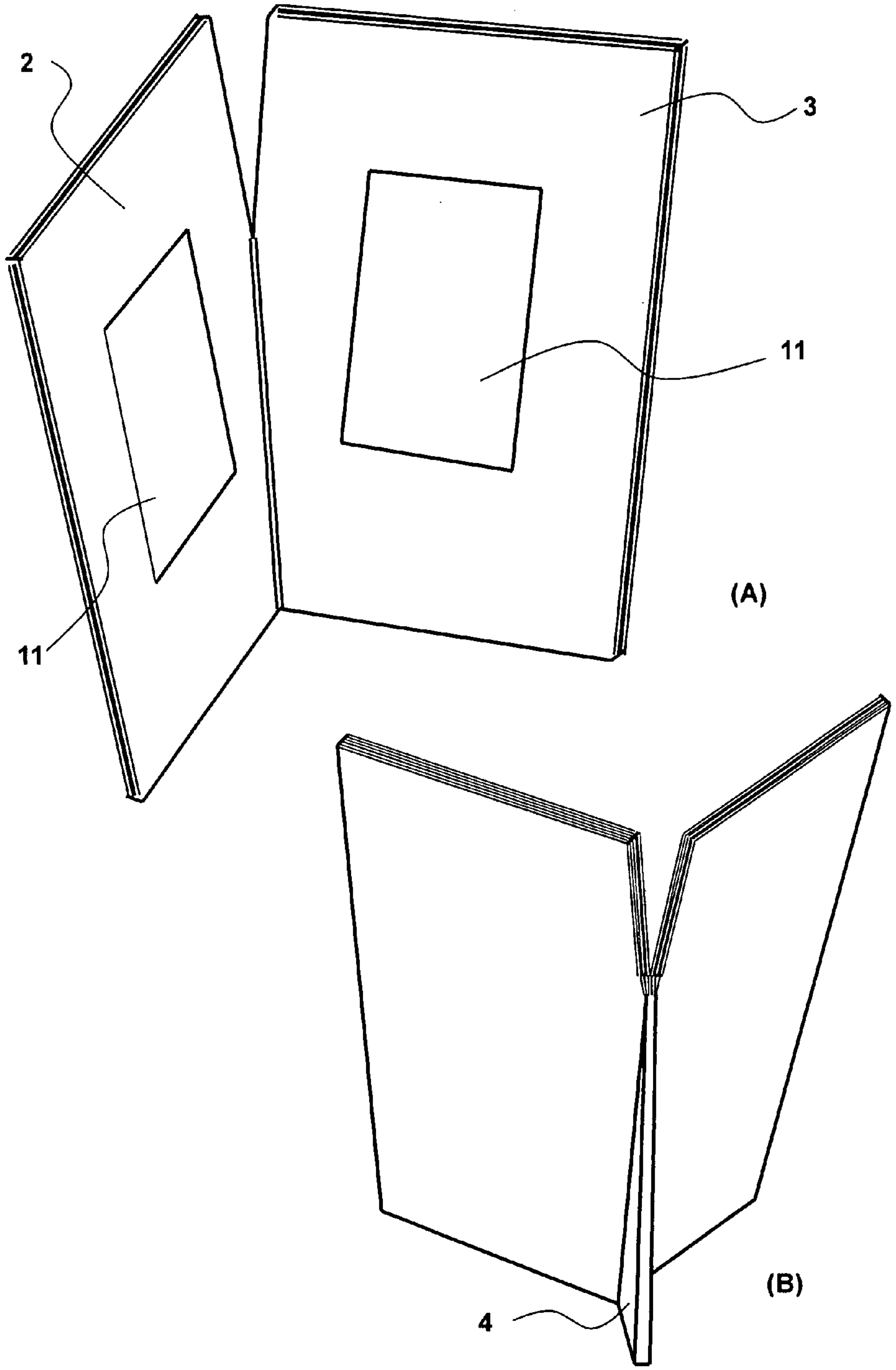

[FIG.6]
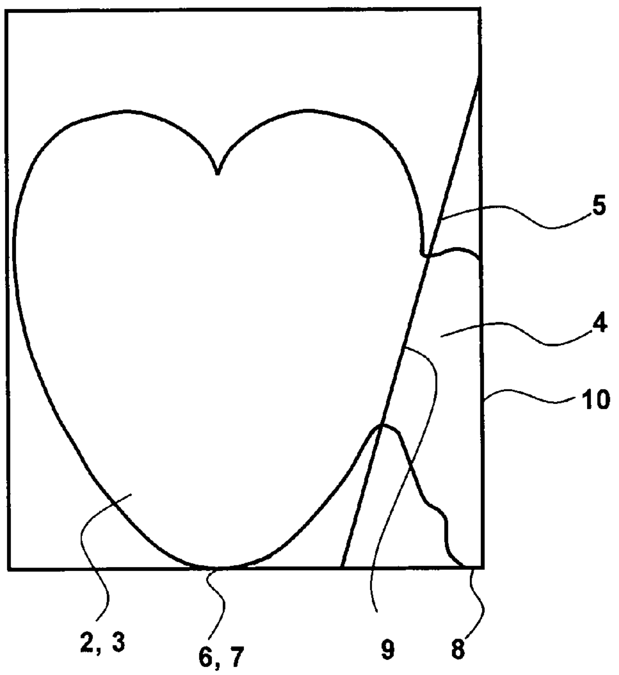
(A)
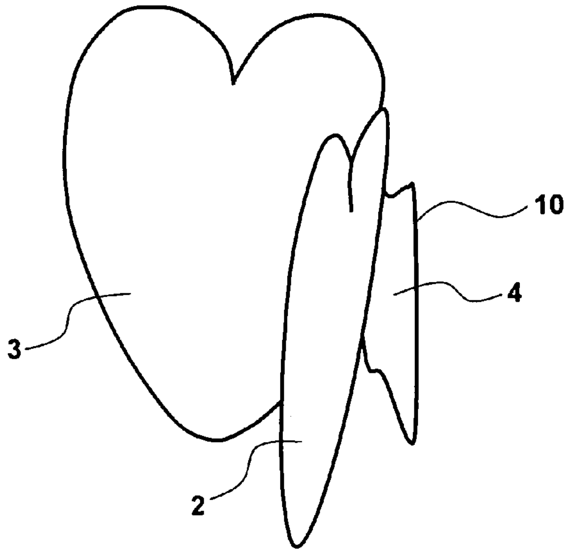
(B)

[FIG.7]
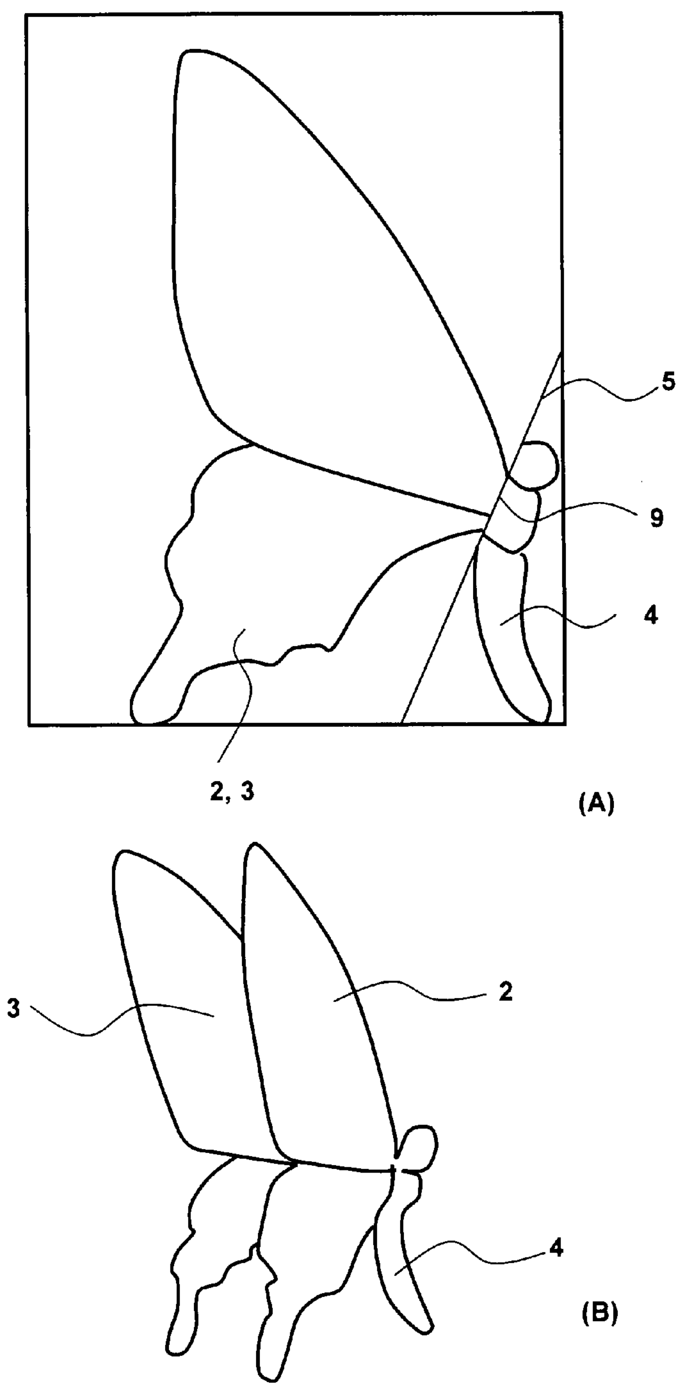

[FIG.8]
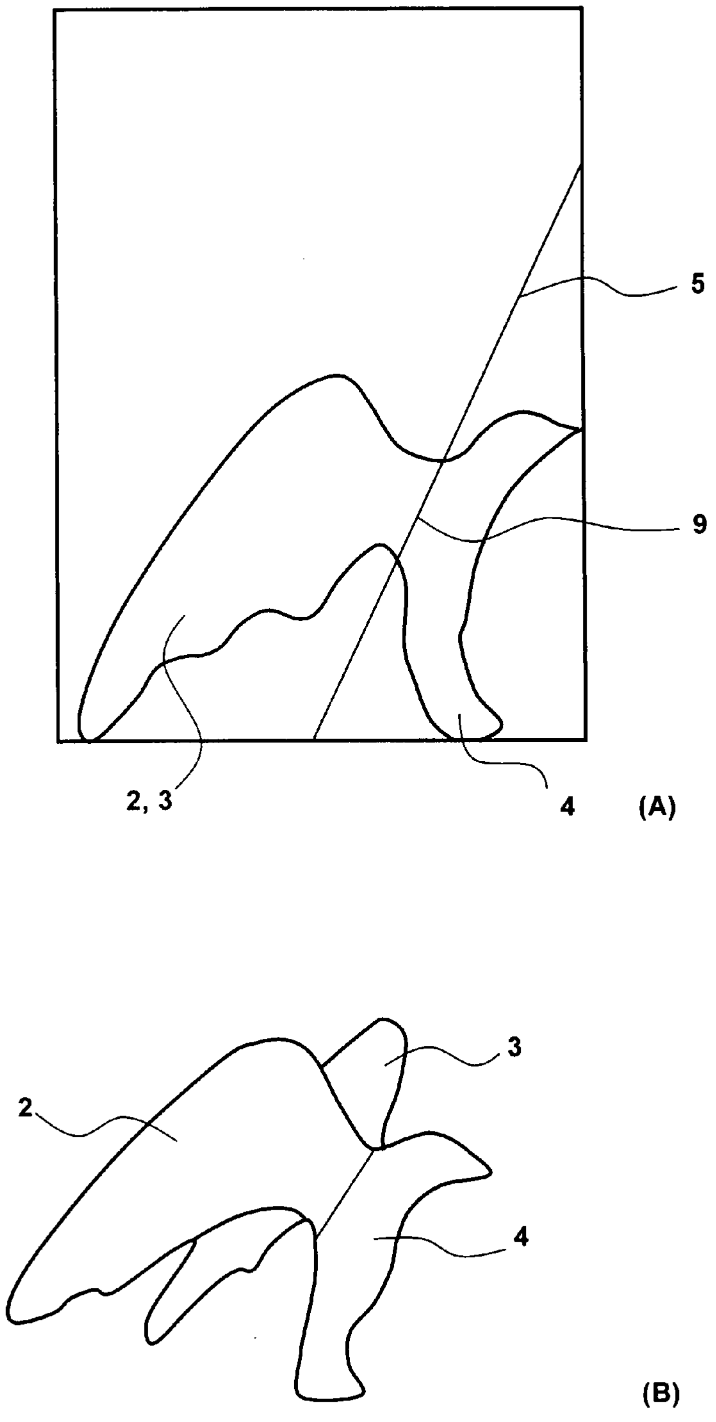

[FIG.9]
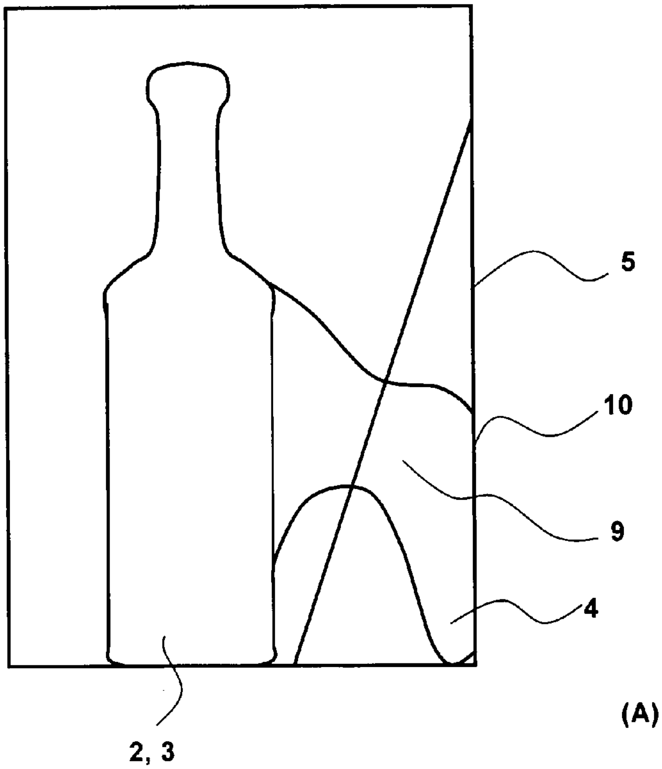
(A)
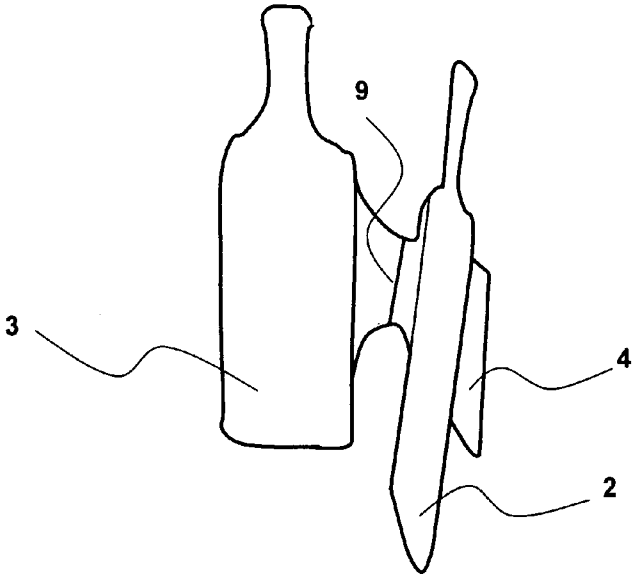
(B)

[FIG.10]
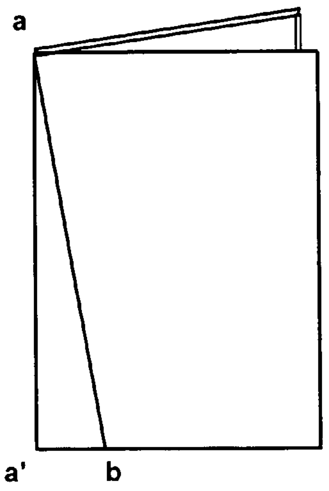
(A)
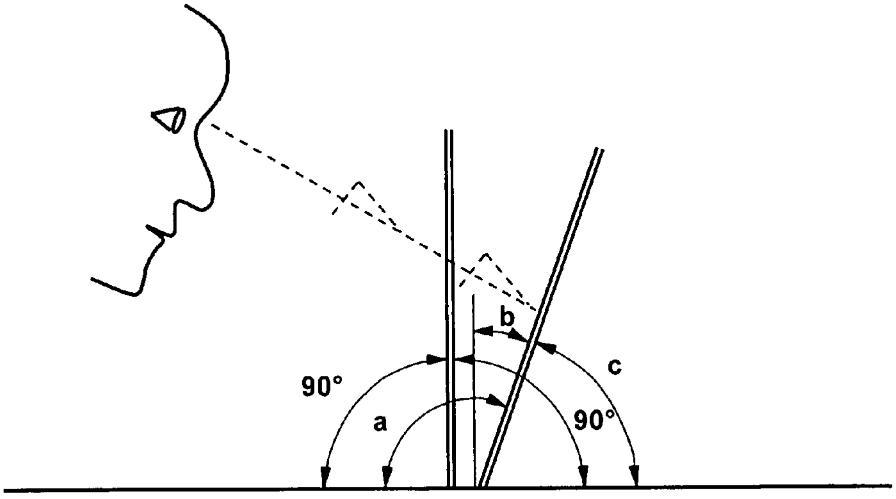
(B)

[FIG.11]
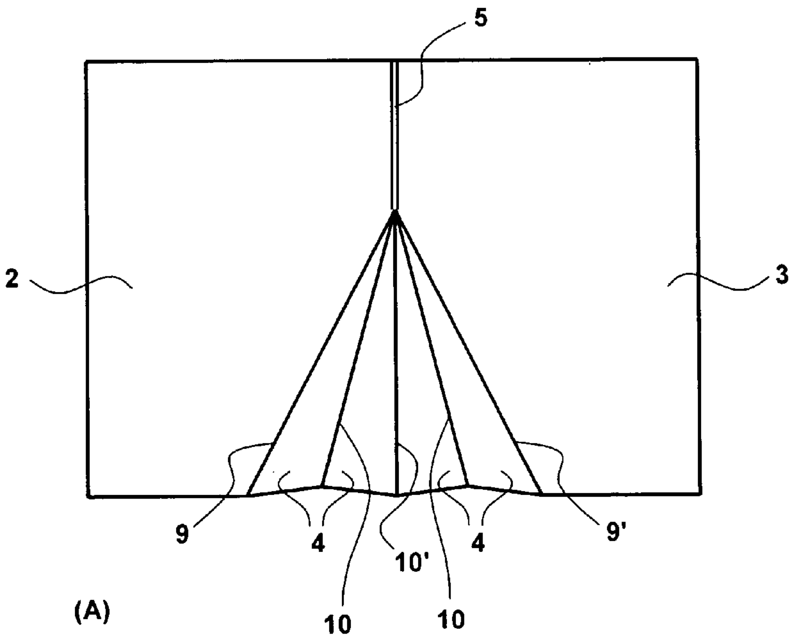
(A)
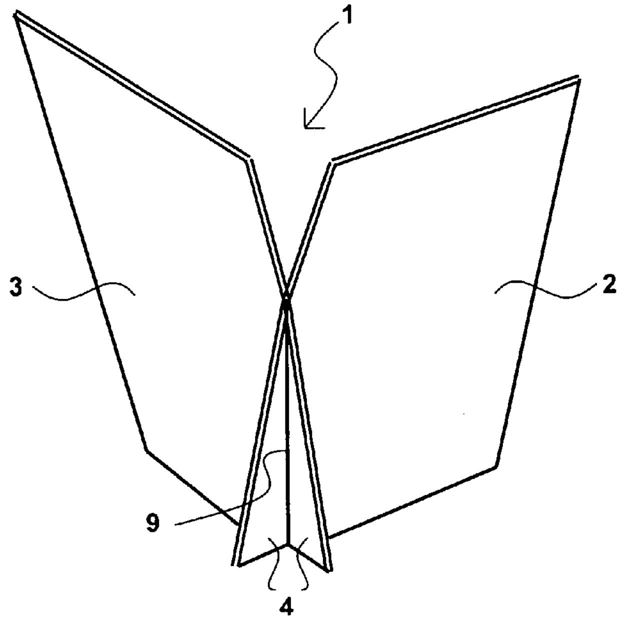
(B)

[FIG.12]
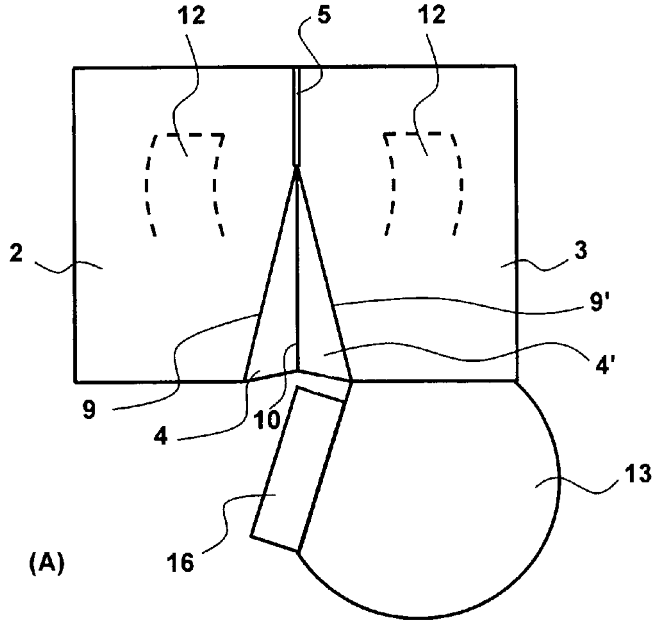
(A)
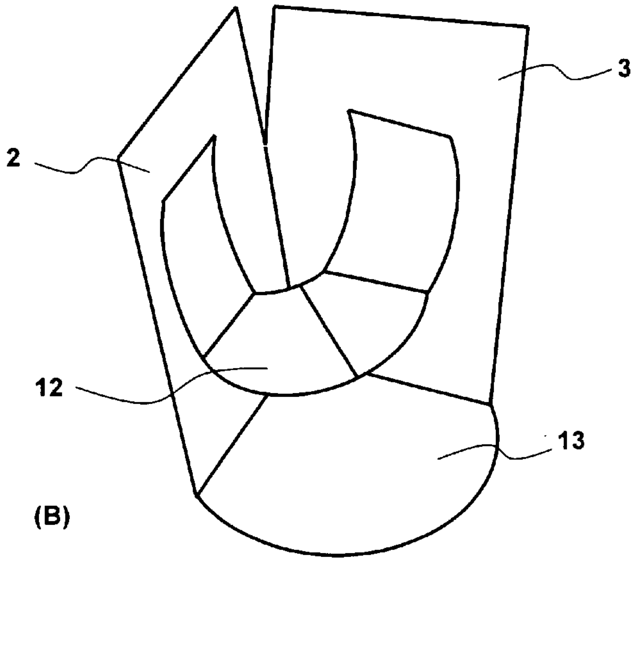
(B)

[FIG.13]
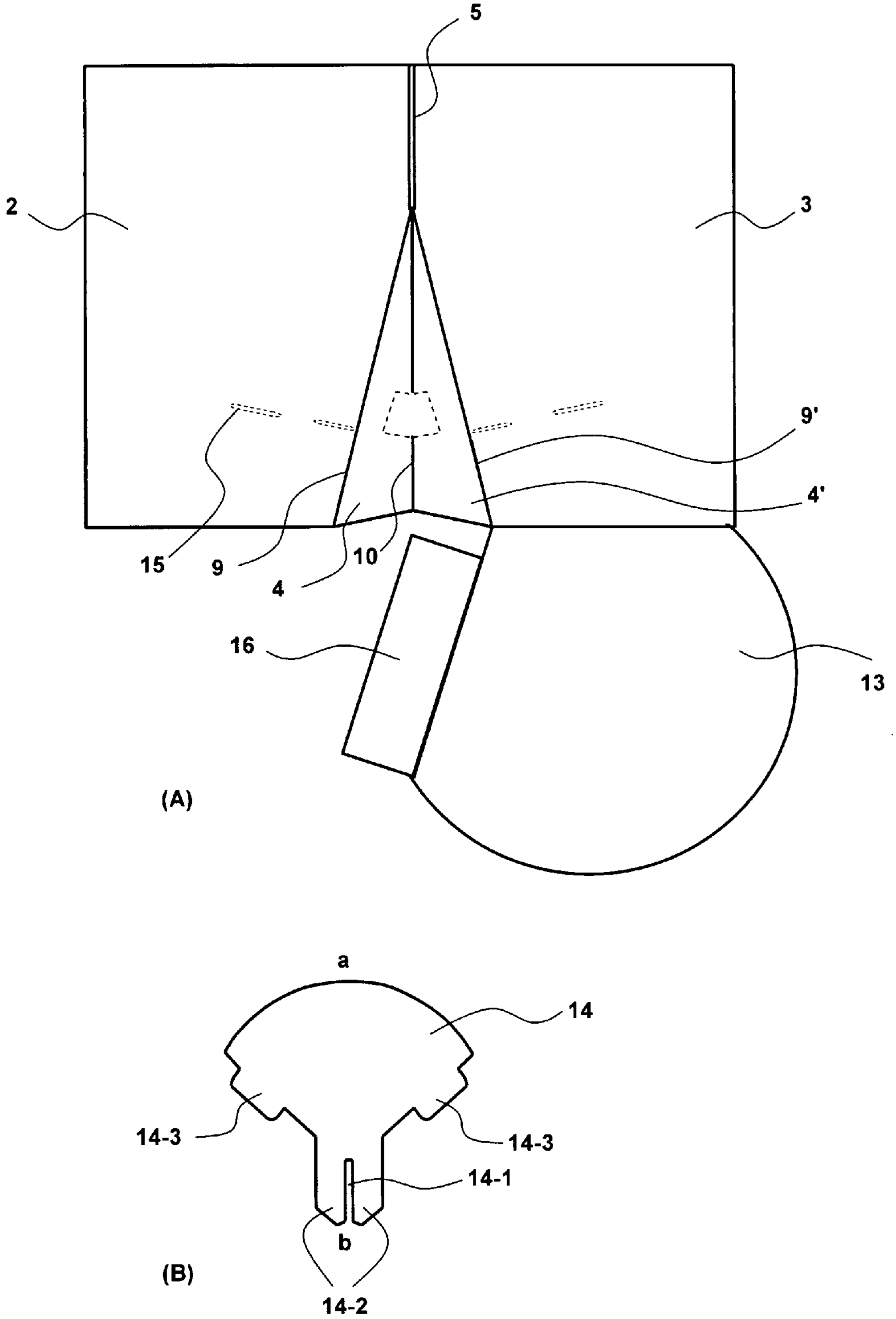

[FIG.14]
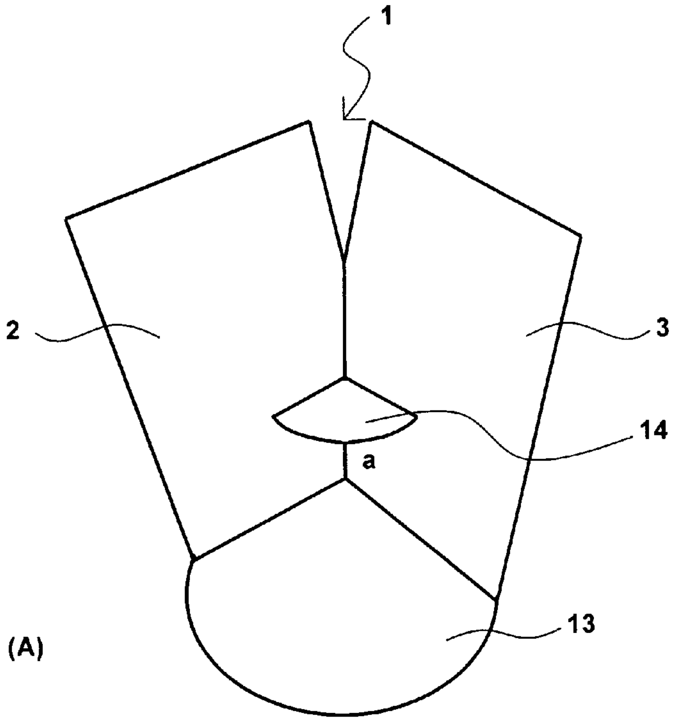
(A)
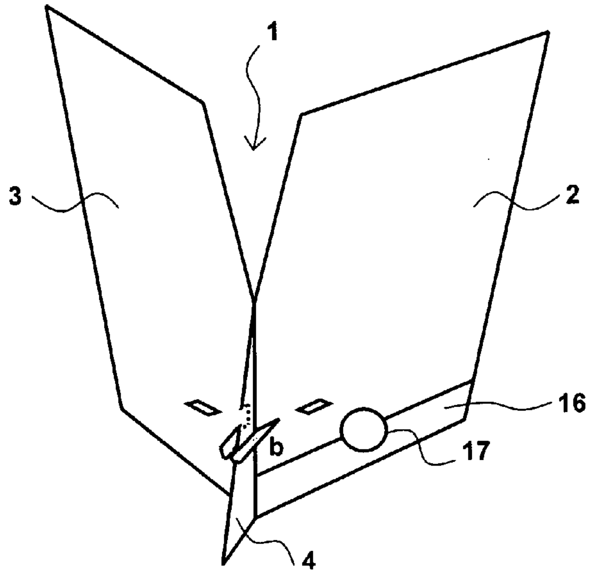
(B)

[FIG.15]
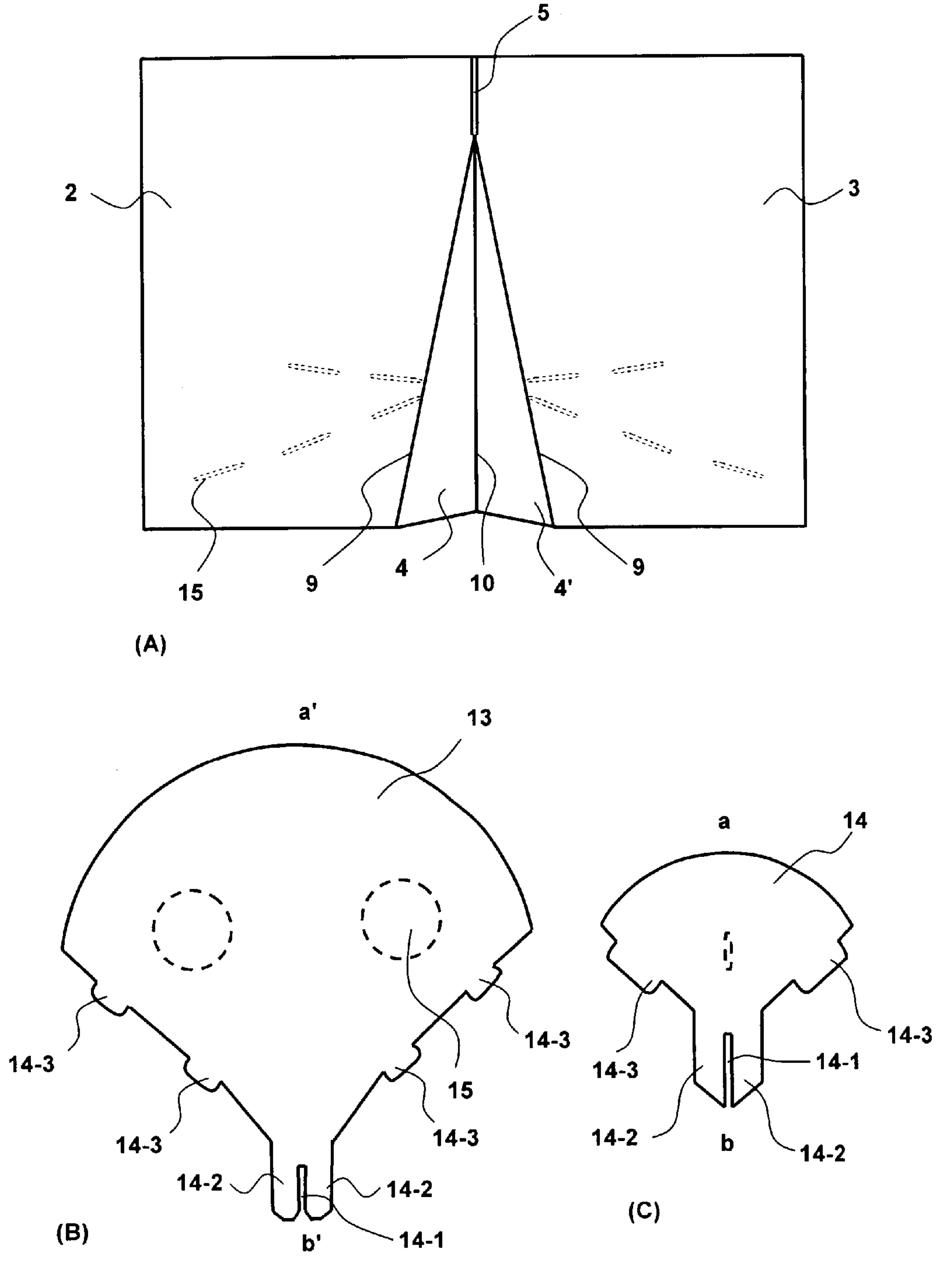

[FIG.16]
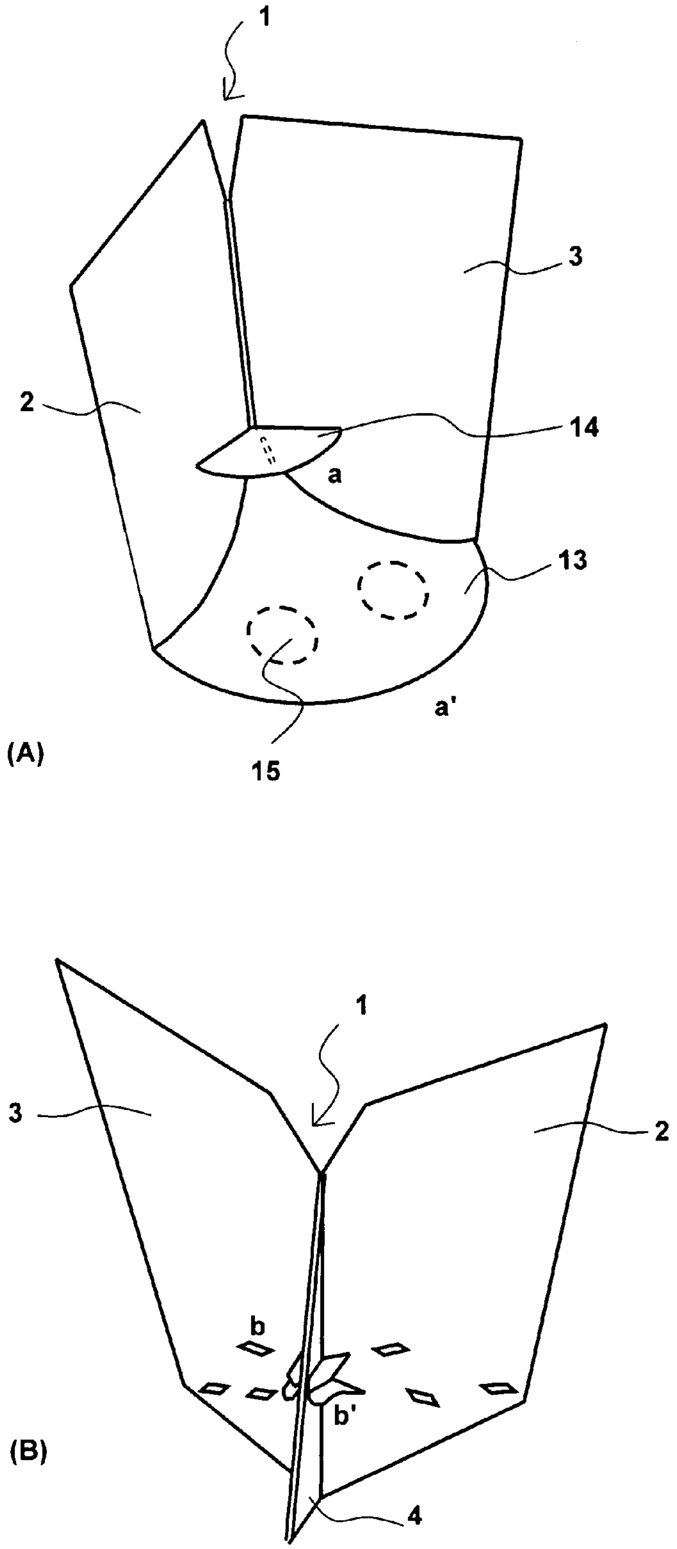

[FIG.17]
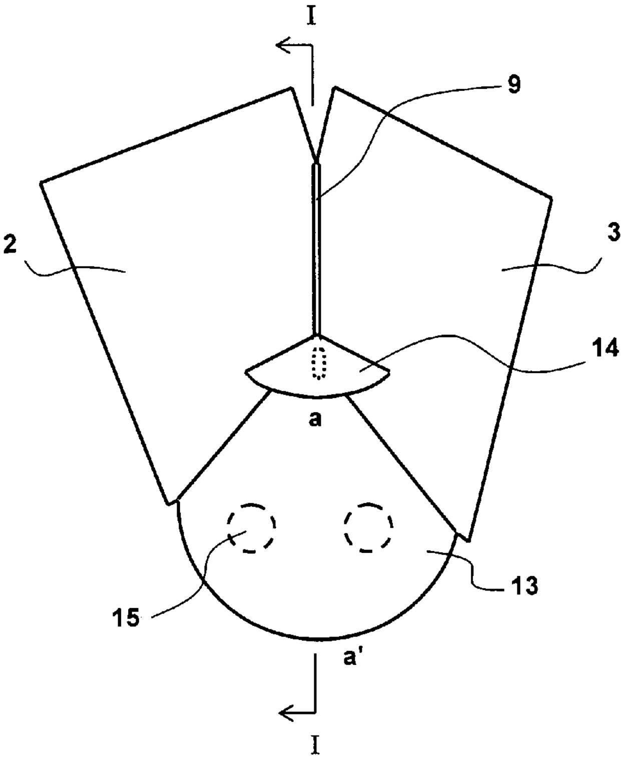
(A)
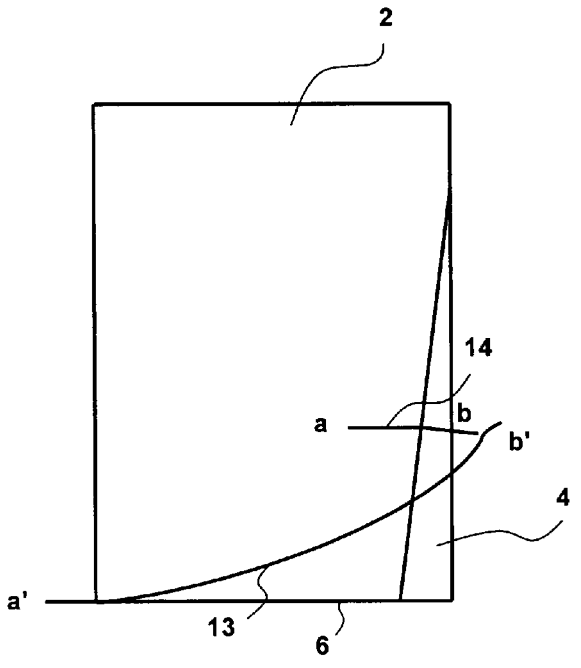
(B)

[FIG.18]
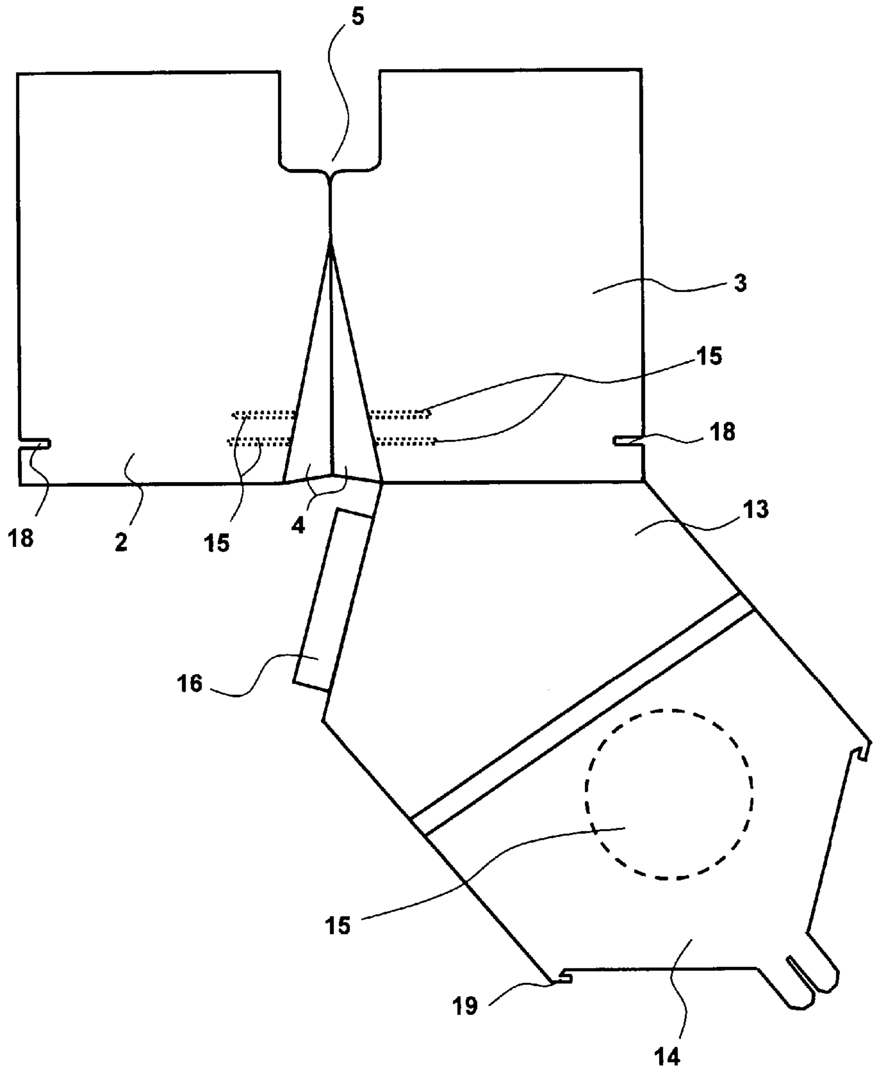

[FIG.19]
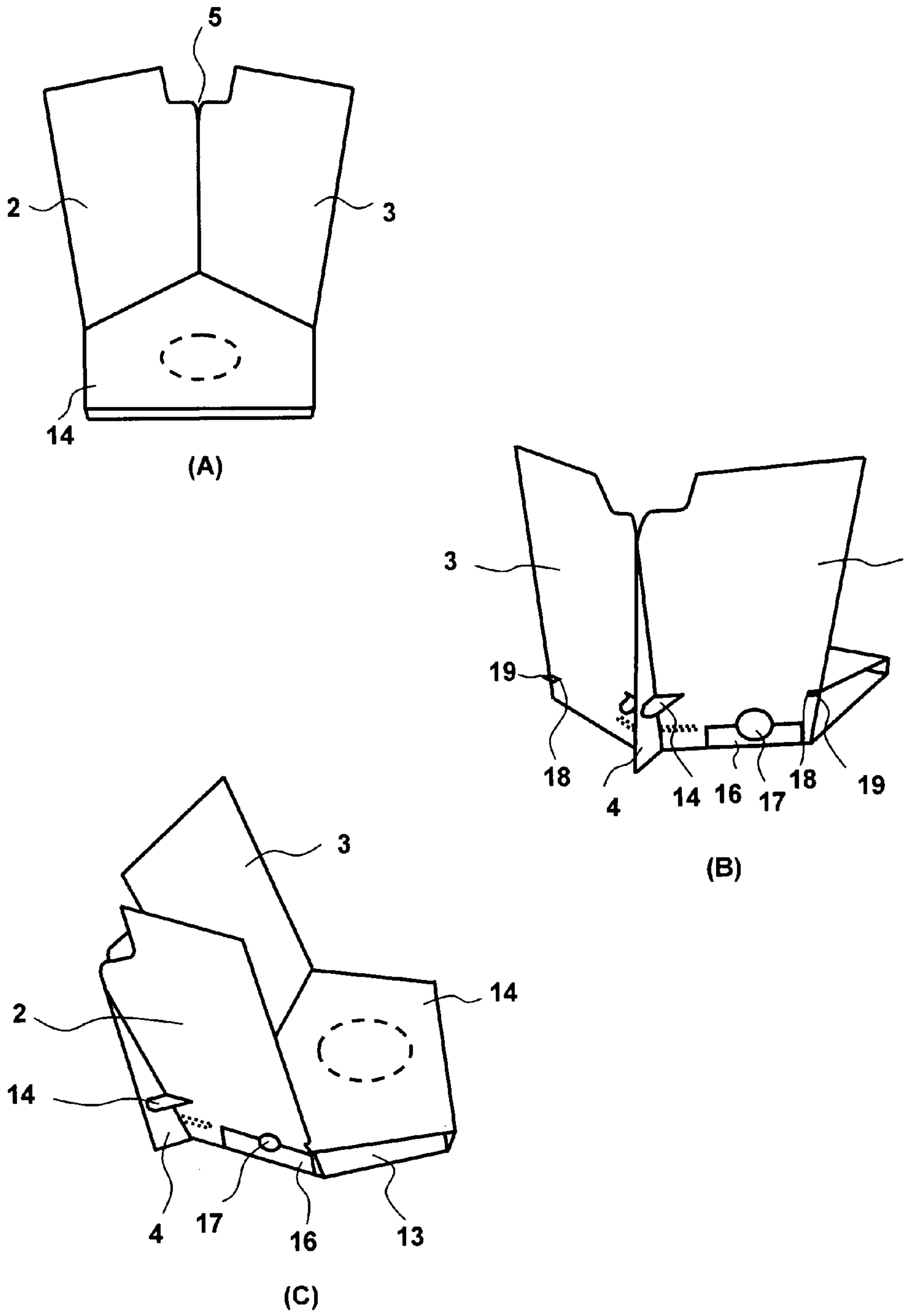

SELF-STANDING FLAT PLATE-LIKE ARTICLE AND METHODS OF EXHIBITING AND MANUFACTURING THE SAME

TECHNICAL FIELD

The present invention relates to a method of standing in a double-spread state a flat plate-like article including a flat article such as a greeting card, postcard, letter paper, telegram, diploma, memo pad, photograph, drawing, menu sheet, list of prices, pamphlet, notebook and so on, and a device for holding and exhibiting such a flat article; as well as the flat plate-like article that can be self-stood when brought into a double-spread state. The present invention further relates to a method and material for manufacturing the flat plate-like article, and the like.

BACKGROUND OF THE INVENTION

For exhibiting a flat exhibited article, such as a greeting card, which is folded in half and exhibited in a double-spread state, not by using a device or tool such as a frame, stand and so on, but by the article itself, the article is generally stood with the crease up, i.e., the crease positioned in parallel with a ground contact surface (e.g. a desktop and the like), or stood with the crease positioned dorsal and vertical relative to the ground contact surface. In the former case, a face exhibited and viewed (i.e., an exhibited surface) is located outside of the double-fold structure and stands by itself normally at an angle slightly diagonally upward than vertical or at an angle of about 95 to 110 degrees. In the latter case, however, an exhibited surface is located inside of the double-fold structure and stands substantially vertically, and thus the exhibited surface cannot be easily observed when exhibited on a desktop and the like.

The same applies not only to those articles basically having an exhibited surface or surfaces on one or both sides of a double-fold of a piece of paper, such as a greeting card, but also to those articles comprising many pages such as a pamphlet and a picture book. Those articles are set substantially vertically when exhibited by standing themselves. Therefore, the exhibited surface cannot be easily observed unless it is exhibited at nearly the same level as that of the eyes of a viewer. However, it is difficult to realize an easily-observable state for multiple people.

To avoid such a problem, there are methods of exhibiting an exhibited article by attaching a supporting member to the article itself, and methods of exhibiting the exhibited article by using a stand and the like which holds the article for exhibiting. These methods, however, require an additional member or device, and thus they are complicated and costly.

Patent document 1: Japanese Provisional Patent Publication (Kokai) Hei 7-148056

Patent document 2: Japanese Provisional Patent Publication (Kokai) Hei 10-236033

Patent document 3: Japanese Provisional Patent Publication (Kokai) 2000-327377

Patent document 4: Japanese Provisional Patent Publication (Kohyo) 2002-515983

Patent document 5: Japanese Provisional Patent Publication (Kokai) 2004-33662

Patent document 6: Japanese Provisional Patent Publication (Kokai) 2000-71662

SUMMARY OF THE INVENTION

A main purpose of the invention is to provide a method for exhibiting a flat plate-like article such as a flat exhibited article so as to be easily observed and less turned over and the flat plate-like article stably and simply exhibitable so as to be easily observed, less turned over and manufacturable at a low cost. Further, another purpose of the invention is to provide a method, material and the like for easily manufacturing such a flat plate-like article.

According to the present invention,

[1] a flat plate-like article comprising two or more flat plate-like members and one or more connection parts, characterized in that:

(A) any first and second flat plate-like members are connected to each other through the connection part which is positioned on the border line of these both members and projected backward from the border line so that the both members can be double-spread; and (B) the flat plate-like article can be self-stood when the first and second flat plate-like members are brought into a double-spread state so that the insides of the first and second flat plate-like members are positioned diagonally upward relative to a ground contact surface with using at least a part of the bottom-side of the connection part, at least a part of the bottom-side of the first flat plate-like member, and at least a part of the bottom-side of the second flat plate-like member as the ground contact parts;

[2] the flat plate-like article according to the above [1], wherein the border line of said both members leans backward relative to the ground contact surface when the first and second flat plate-like members are brought into a double-spread state;

[3] the flat plate-like article according to the above [1], wherein the border line of said both members or the extended line thereof is intersecting with the ground contact surface in the polygonal region on the ground contact surface formed by the ground contact parts when the first and second flat plate-like members are brought into a double-spread state;

[4] the flat plate-like article according to any one of the above [1]-[3], wherein the number of flat plate-like members is three or more;

[5] the flat plate-like article according to any one of the above [1]-[4], wherein the number of connection parts is two or more;

[6] the flat plate-like article according to any one of the above [1]-[5], wherein the connection part is a member having a substantially triangle surface which has as its two sides the border line of said both members and the connection part, and the bottom-side of the connection part;

[7] the flat plate-like article according to any one of the above [1]-[6], wherein the connection part is a member having a surface of a substantially right triangle or obtuse triangle which has as the hypotenuse the border line of said both members and the connection part;

[8] the flat plate-like article according to any one of the above [1]-[7], wherein the first and second flat plate-like members are separated each other upward from the connection part;

[9] the flat plate-like article according to any one of the above [1]-[8], wherein at least one of the first and second flat plate-like members has a tongue-like part which can be projected from the first and/or second flat plate-like member when the first and second flat plate-like members are brought into a double-spread state;

[10] the flat plate-like article according to the above [9], wherein the tongue-like part can be projected inward in a double-spread state;

[11] the flat plate-like article according to any one of the above [9] or [10], wherein the tongue-like part can be projected at an angle of 0 to 45 degrees relative to the ground contact surface;

[12] the flat plate-like article according to any one of the above [1]-[11], wherein the flat plate-like article further has a ground contact member which can cover at least a part of the ground contact surface inside of the first and second flat plate-like members when the first and second flat plate-like members are brought into a double-spread state;

[13] the flat plate-like article according to any one of the above [1]-[12], wherein the flat plate-like article is a flat exhibited article such as a greeting card, postcard, letter paper, telegram, diploma, memo pad, photograph, drawing paper, menu sheet, list of prices, pamphlet, notebook, card or book showing a cooking recipe, photograph, illustration and so on, tabletop calendar, display board and so on; or a flat exhibiting device for holding and exhibiting such a flat exhibited article, such as a photo frame, casing trim, mat board, photo album, card holder, stand, CD case, DVD case, file note, and loose leaf binder;

[14] the flat plate-like article according to any one of the above [1]-[13], wherein the first flat plate-like member, the connection part and the second flat plate-like member are formed from a piece of a flat plate-like material;

[15] a method for exhibiting a flat plate-like article, comprising:

bringing the flat plate-like article comprising two or more flat plate-like members and one or more connection parts, said flat plate-like article being characterized in that any first and second flat plate-like members are connected to each other through the connection part which is positioned on the border line of the both members and projected backward from the border line so that the both members can be double-spread, into a self-standing double-spread state of the first and second flat plate-like members using at least a part of the bottom-side of the connection part, at least a part of the bottom-side of the first flat plate-like member, and at least a part of the bottom-side of the second flat plate-like member as ground contact parts, and exhibiting the insides of the first and second flat plate-like members diagonally upward relative to a ground contact surface;

[16] a method for manufacturing a flat plate-like article comprising two or more flat plate-like members and one or more connection parts, said flat plate-like article being characterized in that, when any first and second flat plate-like members are brought into a double-spread state, the flat plate-like article can be self-stood using at least a part of the bottom-side of the connection part, at least a part of the bottom-side of the first flat plate-like member, and at least a part of the bottom-side of the second flat plate-like member as ground contact parts, with the insides of the first and second flat plate-like members positioned diagonally upward relative to a ground contact surface, said method comprising:

(1) sectionalizing a piece of a flat plate-like material into regions of the first flat plate-like member, the connection part, and the second flat plate-like member so that these regions are arranged in this order laterally relative to the line longitudinally passing through the center of the connection part, and (2) folding back the region of the connection part along the line longitudinally passing through the center so that the border line with the region of the first flat plate-like member and the border line with the region of the second flat plate-like member are put together to convert the region of the connection part into the connection part having a substantially triangle surface having the bottom-side which can contact to a ground;

[17] a method for manufacturing a flat plate-like article comprising three or more flat plate-like members and one or more connection parts, said flat plate-like article being characterized in that, when any first and second flat plate-like members are brought into a double-spread state, the flat plate-like article can be self-stood using at least a part of the bottom-side of the connection part, at least a part of the bottom-side of the first flat plate-like member, and at least a part of the bottom-side of the second flat plate-like member as ground contact parts, with the insides of the first and second flat plate-like members positioned diagonally upward relative to a ground contact surface, said method comprising:

(1) preparing a book-like article in which the three or more flat plate-like members have been bound at a binding part so that they can be double-spread, and (2) converting a part containing the binding part into the connection part having a substantially triangle surface having the bottom-side which can contact to a ground;

[18] the method for manufacturing according to the above [17] or [18], wherein the converting into the connection part is performed by means of bonding or adhering, or nipping with a nipping member;

[19] a flat plate-like material for producing the flat plate-like article according to the above [1], characterized in that:

(1) the material has been sectionalized into regions of the first flat plate-like member, the connection part, and the second flat plate-like member so that these regions are arranged in this order laterally relative to the line longitudinally passing through the center of the connection part, and (2) the region of the connection part can be folded back at the line longitudinally passing through the center so that the border line with the region of the first flat plate-like member and the border line with the region of the second flat plate-like member are put together to form the connection part having a substantially triangle surface having the bottom-side which can contact to a ground;

[20] the flat plate-like material according to the above [17], having a printable surface on at least one side of the material;

[21] the flat plate-like material according to the above [19] or [20], wherein the flat plate-like material comprises a layer of a tacky agent or an adhesive agent under a layer of the printable surface in at least the region of the connection part, and the connection part can be formed by removing the layer of the printable surface in the region of the connection part followed by adhering or bonding both sides of the line passing through the center of the connection part by means of the layer of the tacky agent or adhesive agent;

[22] the flat plate-like material according to any one of the above [19] to [20], wherein the flat plate-like material has a means for separating, such as a notch, perforation and the like, above the connection part on the straight line passing longitudinally through the center of the connection part, are provided.

According to the present invention, a method for exhibiting a flat plate-like article such as a flat exhibited article so as to be easily observed and less turned over, the flat plate-like article such as an exhibited article and a device for exhibiting the same, as well as a method and material for manufacturing the flat plate-like article and the like are provided.

The method of the invention has an extensive area of application, and can be easily applied to any flat article.

Further, the flat plate-like article of the invention is composed of a minimal constitution with no need for an additional supporting member or the like. Therefore, manufacturing the article is easy and advantageous in terms of costs. Besides, operations such as exhibiting and taking away the article are also easy because it can be easily exhibited by anyone by simply bringing it into a double-spread state.

Moreover, the exhibited surface inside the double-spread is positioned diagonally upward, i.e., at an angle of more than 90 degrees relative to a ground contact surface. Thus, it is very easily observable and noticeable to make the exhibition effective. Furthermore, since it is stable and less turned over, it can be exhibited fully stably even when the angle between the ground contact surface and the exhibited surface inside the double-spread, i.e., the angle marked "a" of FIG. 10, (B), is around 140 degrees.

BRIEF DESCRIPTION OF THE DRAWINGS

FIG. 1 shows one embodiment of the flat plate-like article of the invention (a flat exhibited article) in a development view (A), front views, one in which the connection part is being folded (B) and the other in which the connection part is adhered and completed to form a double-spread state (C), a perspective view (D), and a rear view (E).

FIG. 2 shows top views of a flat exhibited article of a conventional double-folded type (A) and a flat exhibited article of the present invention as shown in FIG. 1 (B).

FIG. 3 shows a development view (A), a front view in a double-spread state (B), a rear view (C), and a perspective view in a closed state, of a flat plate-like article (a flat exhibited article) of the present invention having a cut above the connection part.

FIG. 4 shows a perspective view (A) and a rear view (B) of a flat exhibited article of a book-type with no cut above the connection part, and a perspective view (C) and a rear view (D) of an embodiment with a cut above the connection part.

FIG. 5 shows a front-perspective view (A) and a rear view (B) of a flat exhibited article of a photo frame-type in a double-spread state.

FIG. 6 shows a plan view of material paper which has been doubled up at the line longitudinally passing through the center of the connection part with the configuration of a decorator article or a memo card of a heart-like shape outlined on it (A), and a perspective view of the decorator article or a memo card standing in a double-spread state (B).

FIG. 7 shows a plan view of material paper which has been doubled up at the line longitudinally passing through the center of the connection part with the configuration of a decorator article or a memo card of a butterfly-like shape outlined on it (A), and a perspective view of the decorator article or a memo card standing in a double-spread state (B).

FIG. 8 shows a plan view of material paper which has been doubled up at the line longitudinally passing through the center of the connection part with the configuration of a decorator article or a memo card of a bird-like shape outlined on it (A), and a perspective view of the decorator article or a memo card standing in a double-spread state (B).

FIG. 9 shows a plan view of material paper which has been doubled up at the line longitudinally passing through the center of the connection part with the configuration of a display article for explaining a commercial product of a bottle-like shape outlined on it (A), and a perspective view of the display article standing in a double-spread state (B).

FIG. 10 is a graphic for illustrating the effects of the flat plate-like article of the present invention. Panel (A) shows that the border line of the first and second members, "ab," leans backward by shaping the connection part into the triangle "aa'b". Panel (B) represents a situation in profile when a person observes the exhibited surface.

FIG. 11 shows a plan view of a flat plate-like material of a mat board for exhibiting a menu sheet held on it (A), and a rear view of the mat board in a double-spread state (B).

FIG. 12 shows a plan view of a flat plate-like material of a desktop display board (A), and a rear view of the completed desktop display board in a double-spread state (B).

FIG. 13 shows a plan view of a flat plate-like material of the body of a display board of a type in which the connection part is nipped and fixed (A), and a plan view of that of a nipping member (B).

FIG. 14 shows a front view (A) and a rear view (B) of the completed display board of a type in which the connection part is nipped and fixed as shown in FIG. 13.

FIG. 15 shows a plan view of a flat plate-like material of the body of a display board having a separated ground contact member (A), as well as plan views of the ground contact member (B) and a nipping member (C) which are separated from the body.

FIG. 16 shows a perspective view (A) and a rear view (B) of the completed display board as shown in FIG. 15.

FIG. 17 shows a front view (A) of the completed display board as shown in FIGS. 15 and 16, and a sectional view (B) when it is cut along the line connecting I-I in (A).

FIG. 18 shows a plan view of the body of a flat plate-like material of a display board having a contiguous ground contact member and a nipping member.

FIG. 19 shows a front view (A), a rear-perspective view (B), and a side-perspective view (C), of the completed display board as shown in FIG. 18.

EXPLANATION OF CODE

1 flat plate-like article
2 first flat plate-like member
3 second flat plate-like member
4, 4' connection part
5 position or region above a connection part
6 bottom-side of a first flat plate-like member
7 bottom-side of a second flat plate-like member
8 bottom-side of a connection part.
9, 9' border line between a flat plate-like member and a connection part
10, 10' line longitudinally passing through the center of a connection part
11 window part
12 tongue-like part
13 ground contact member
14 nipping member
14-1 nipping part
14-2 leg part
14-3 insertion part
15 opening
16 flap part
17 adhesive sticker
18 notch
19 anchor part
a front side (inside of double-spread)
b back side (dorsal side)

BEST MODE FOR PERFORMING THE INVENTION

In the present invention, "a flat plate-like article" means any flat structure, i.e., an article which has a sufficiently small height (thickness) compared to a plane constituted by longitudinal and transversal dimensions when the shape of the article is expressed by the longitude, the width and the height (thickness). Such a flat plate-like article includes: flat articles that are subjects for exhibition or observation by themselves (herein referred to as “a flat exhibited article(s)” for convenience’ sake), such as a greeting card, postcard, letter paper, telegram, diploma, memo pad, photograph, paper materials for drawing (drawing paper, illustration board and the like), menu sheet, list of prices, pamphlet, notebook, card or book showing a cooking recipe, photograph, illustration and the like, desktop calendar, display board of sizes from a desktop-type to a large floor-type of in-store use used for explaining a commercial product and for other purposes; as well as exhibiting devices for holding and exhibiting such a flat exhibited article (herein referred to as “a flat exhibiting device(s)” for convenience’ sake) such as a photo frame, frames for art, a mat board, photo album, card holder, stand, CD case, DVD case, and the like.

The flat plate-like article of the present invention comprises at least a first flat plate-like member and a second flat plate-like member (hereinafter these may be abbreviated as “a first member” and “a second member,” respectively).

With regard to the present invention, “an exhibited surface(s)” refers to a surface on which information as the subject of exhibition or observation is carried, and normally is a surface positioned inside when the first and second members are in a closed or double-spread state. However, in certain types of embodiments as described below, the outside surface(s) can also be an exhibited surface(s).

With regard to the present invention, “the bottom-side” refers to the side positioned at the bottom in an exhibited state, and the side belongs to a part which is contacted (grounded) with a surface (a ground contact surface) of a place where the exhibited article is set (the place is normally substantially horizontal) such as a surface of a desk, floor, and the ground. The “bottom-side” may be substantially a point, in such a case where a first and/or a second member and/or a connection part has a rounded form so that the ground contact part is as small as a point.

“A border line” refers to a line located at the boundary between any two members, for example, a line passing between first and second members. As described below, in case a piece of contiguous material is used, a border line between the first or second member and the connection part in the material may also become the border line between the first and second members after the connection part has been formed. A border line may not be “a line” in a strict sense, and may have a certain range of breadth and/or thickness, for example, as in the case where the connection part has a form such as that of a ring file or loose leaf binder.

Further, “backward” from a border line means the direction opposite to an exhibited surface positioned inside of double-spread, i.e., the direction to the dorsal side of the first and second members.

The flat plate-like article of the present invention has a border line of first and second flat plate-like members which leans backward relative to a ground contact surface when the first and second flat plate-like members are brought into a double-spread state. As a result, the insides of the double-spread are positioned diagonally upward relative to the ground contact surface. The relationship between the degree of lean and the positions of members may be adjusted to have an angle such that, when the first and second flat plate-like members are brought into a double-spread state, the border line of these members or its extended line intersects with the ground contact surface within the polygonal region on the ground contact surface formed by contacting of at least a part of the bottom-side of the connection part, at least a part of the bottom-side of the first flat plate-like member, and at least a part of the second flat plate-like member. By doing so, the article may be more advantageous in terms of the stability.

It is also preferable that while the first and second flat plate-like members are connected at the connection part, they are separated in a position above the connection part (or at least at their top ends). By having such a structure, the article will be more easily observed and increased in the stability, resulting in a better looking when exhibited in a double-spread state.

While the flat plate-like article of the present invention may have at least two flat plate-like members each of which can serve as a first flat plate-like member and a second flat plate-like member, it may have three or more flat plate-like members like the case of a pamphlet, notebook, book, or album, for example. In such an embodiment, the article can be kept standing with any pages in the book-like structure open. Thus, such an embodiment is particularly convenient, for example, for those articles of practical uses as recipe books for cooking, manuals for operations which require using both hands, and books of music, and for those of visual purposes as books of photographs and photo albums having many exhibited surfaces.

In addition to the first and second members (hereinafter may be abbreviated as the “both members”), the flat plate-like article of the present invention comprises a connection part connecting said both members. The connection part is a member projecting backward from the border line of the both members. The connection part may be only one; it may be two or more. In the latter case, ground contact parts are four or more, so that the flat plate-like article may be further improved in the stability. The connection part is preferably a member that is flat and plate-like, and/or has a substantially triangle surface with the two sides composed of the border line of the both members and the bottom-side of the connection part. The phrase “substantially triangle” is intended to include all shapes that can be approximated to a triangle as a whole. A triangle may not necessarily be composed of the sides of straight lines, and may not necessarily be composed of clearly differentiable three sides (e.g. a corner(s) may be round). Further, a triangle may be a polygon having four or more sides, such as a trapezoid (a quadrangle) with the longer one of the parallel sides serving as the bottom-side and the shorter being sufficiently short.

More preferably, the connection part is a member having a surface of a substantially right triangle or obtuse triangle with the hypotenuse composed of the border line of the both members. Although “a hypotenuse” generally refers to the side other than the two sides which form the right angle in a right triangle, in the present invention, a hypotenuse includes the side in an obtuse triangle other than the two sides which form the obtuse angle in addition to the normal hypotenuse. Further, being “substantially” a right triangle or an obtuse triangle is intended to include a triangle having a side that is not necessarily a straight line. In particular, a triangle in which one or both of the sides corresponding to the sides composing the right angle or the obtuse angle is regarded as a “substantially” right triangle or obtuse triangle, as far as the straight line or lines that are the best approximation to the side or sides form the right or obtuse angle.

The flat plate-like article of the present invention may also have an additional constituent element. For example, the first and the second flat plate-like members may have a tongue-like part which can be projected from a surface of the first and/or the second flat plate-like member when these both members are brought into a double-spread state. Such a tongue-like part may be formed utilizing a part of the first and/or second member by making a cut such as a U-shaped cut, a fan-shaped cut with a part of the fan shape left uncut, and soon. It may also be formed by attaching or otherwise putting another member on the first and/or the second member. The tongue-like part needs to have a part connected to the first and/or the second member. Conveniently the tongue-like part can be projected from a surface of the first and/or the second member, for example, by folding it when the first and the second members are brought into a double-spread state. Accordingly, the tongue-like part preferably has a thickness which would not impede closing the flat plate-like article. Incidentally, the expression "tongue-like" is only used as a matter of convenience, and there is no limit in the shape of that part.

Such a tongue-like part can be projected inwardly in a double-spread state to create a space for putting an object (e.g. a decorator article or a demonstrator product) on it. When using the tongue-like part for putting an object on it, it is advantageous that the tongue-like part is projected at an angle parallel (i.e., horizontally or at an angle with the ground contact surface of zero degree) or nearly parallel to a ground contact surface. The tongue-like part may be projected preferably at an angle between zero and 45 degrees relative to the ground contact surface (vertically or at an right angle with the ground contact surface), and more preferably at an angle between zero and 30 degrees relative to the ground contact surface.

In addition to essential constituent elements, the flat plate-like article of the present invention may further have a ground contact member which can cover at least a part of a ground contact surface inside of the first and second flat plate-like members when these both members are brought into a double-spread state.

When the flat plate-like article of the invention is exhibited on a desk, for example, such a ground contact member can cover an area on the desk where the article is set to make a state as if the article was placed on a rug. Accordingly, an embodiment having a ground contact member is especially effective when effects of a space integrated or uniform with the flat plate-like article by identifying the color(s), design and so on of the ground contact surface are desired, for example, when various sizes of display boards are exhibited in many stores.

A ground contact member may be contiguous with the first and/or the second member. In such a case, it may be formed so as to be folded up when the article is in a closed state and to expand when the flat plate-like article is exhibited. Alternatively, a ground contact member may be an independent member separated from the body of the flat plate-like article, and may be combined with the body when the article is exhibited. A ground contact member, as in the case of a tongue-like part, is preferably flat and plate-like, and when it is unitary with the body it preferably has a thickness which would not impede closing the flat plate-like article of the present invention. The shape may be a fan-shape, hemicycle, and the like, with no particular restriction.

The flat plate-like article of the present invention has at least two flat plate-like members. Here the two or more flat plate-like members, each being a flat member such as a monolayer or multilayer sheet, are two or more flat plate-like members having nearly same shapes and nearly same sizes, typically exemplified by the right and left halves of a piece of double-folded paper or a double-folded photo frame. The shapes and sizes, however, may be different each other or one another as far as the flat plate-like article can self-stand in a double-spread state, and may be symmetrical or asymmetrical along the boundary of the connection part. The two or more flat plate-like members may also be of materials different each other or one another.

Materials of the first and second flat plate-like members composing the flat plate-like article of the invention needs to have a thickness and/or hardness which can make the flat plate-like article able to self-stand. For example, various types of paper, cloths such as a felt, wood, plastics, glasses, metals and the like can be used alone or in combination. For instance, a greeting card can be produced by using a cardboard alone, and a photo frame can be produced by using wood or paper for the mat board and the frame and using a glass or plastic sheet for the member covering a photo.

Those materials as described above may be used for the connection part, tongue-like part, and ground contact member. Further, in some embodiments, the connection part can be formed by nipping with a nipping member, which is described below, and the same as above applies to the nipping member.

In the flat plate-like article of the invention, each flat plate-like member is connected by the connection part. Connecting of the first and second members may be realized by using a piece of flat plate-like material, i.e., a piece of originally-contiguous material as the first and the second members. Alternatively, it may be realized by connecting distinct pieces of a material or materials with another member such as an adhesive tape, adhesive agent, paper, staple and the like. The same applies to the connection part, tongue-like part, and ground contact member.

When the both sides of a double-fold are of the same material, a piece of material is used as the starting material, the both members and the connection part positioned in-between the members are configured, the material is folded back along the line passing through the center of the connection part, and the parts from the center line to the border lines of each of the members and the connection part are bonded, so that the first and second members connected by the bonded parts as the connection part can be readily produced.

More specifically, at first a piece of flat plate-like material is sectionalized into regions of the first flat plate-like member, the connection part, and the second flat plate-like member so that these regions are aligned in this order laterally relative to the line passing longitudinally the center of the connection part. The sectionalized regions may be explicitly indicated by any measure, for instance, by expressing the border line of each region with a groove such as an embossed trace or with a drawing line and by coloring each region differently. Alternatively, the sectionalized regions may be implicit. At this point, a cut, or a separatory measure such as perforation for making the later separation easy, may be set along the straight line passing longitudinally through the center of the connection part and above the connection part (in other words, at least upper extremity on the border line of the first and second members where they are directly bordering over the connection part).

A flat plate-like material in such a state can be provided as printing paper used for a copying machine, printer and the like, as photographic paper, or as a mat board for mounting and exhibiting a desired flat exhibited article (e.g. a photograph). A flat plate-like material preferably has a printable surface on at least one side. In that case, a flat plate-like article of the present invention can be formed by printing desired letters, a drawing, a photograph and the like on the flat plate-like material of the present invention, followed by folding back the region of the connection part along the straight line passing through the center longitudinally so that the border line of the regions of the first flat plate-like member and the connection part, and the border line of the region of the second flat plate-like member and the connection part are combined, to form the connection part having a substantially triangle surface with the bottom-side which is able to contact a ground.

It is also highly convenient to form the flat plate-like material so that it has a layer of an adhesive or bonding agent under the layer of the printable surface in at least the region of the connection part, and the connection part can be formed by removing the printable surface layer in the region of the connection part and folding the region inwardly to make a valley fold relative to the straight line passing through the center of the connection part to adhere or bond the region. As an adhesive or bonding agent, any such a known agent may be appropriately selected and used depending on the nature of the flat plate-like material, purpose of using, environment of using, and so on. For example, the agent includes a rewetting adhesive agent, pressure sensitive adhesive agent, re-stripping adhesive agent and so on. Further, the adhesive or bonding agent may be used in a form of composition per se, or in a form being supported on an appropriate supporting member (in a form of an adhesive member or bonding member).

Alternatively, either with using or without using an adhesive or bonding agent, another method of forming the connection part may be used in which the connection part can be fixed by nipping with a nipping member prepared separately after the region of the connection part has been folded as above. The nipping member may be, a member having a nipping part which can hold the connection part from the both sides of the connection part. The nipping part may be a part having a groove which can nip the connection part from the both sides, and the groove may be formed by a pair of (projecting) structures (leg parts). More specifically, the nipping member may be those members such as paper clips and pinches, and may be a flat member composed of a material or materials as described above for the flat plate-like member. In this case, the nipping member may nip the connection part from the back or front (inside the double-spread). The type which nips from the front is considered as being more stable, since the center of mass is closer to the center of the body. Further, a nipping member of the type which nips from the front and is flat can also serve as a space for putting an object on it which is similar to the space produced by a tongue-like part as described above by, for example, being inserted into the connection part through an opening set inside of the double-spread. Besides, the nipping member may have a projecting part (insertion part) to be inserted into an opening set other than the both sides of the connection part of the flat plate-like member(s), a projecting part (anchor part) to be inserted into a notch (gain) set outside of the flat plate-like member(s), and so on. The presence of such an additional inserting structure have an effect of making the double-spread structure more stable among others, and thus is advantageous when the nipping part is relatively large or is used for putting an object on it.

For example, FIG. 1 shows an embodiment of the flat exhibited article, the flat plate-like material, and the method for manufacturing the flat exhibited article, of the present invention. Firstly, a piece of paper (i.e., the flat plate-like material of the invention) of the shape as shown in FIG. 1(A) is prepared. A valley fold is made by folding the paper along the line passing through the center of the connection part 10, while mountain folds are made along the border line of the first member and the connection part 9, and along the border line of the second member and the connection part 9' (FIG. 1(B)). The connection parts 4 and 4' are combined and adhered (FIG. 1(C)) to form the connection part projecting backward. While this flat exhibited article can be folded in half with the exhibited surface of the first member 2 and the exhibited surface of the second member 3 being insides, it can be self-stood in a double-spread state with the exhibited surface of the first member 2 and the exhibited surface of the second member 3 facing diagonally upward relative to a ground contact surface, and with the bottom-side of the first member 6, the bottom-side of the connection part 8, and the bottom-side of the second member 7 being in contact with the ground surface (see the perspective and rear views as shown in FIGS. 1 (D) and (E), respectively).

FIG. 2 shows top views of this embodiment of flat exhibited article of the present invention (B) and a conventional double-fold type article (A). The conventional article (A) is unstable since the ground contact points marked “a”, “b”, and “c” are arranged on a nearly straight line. On the other hand, the article of the invention (B) has an improved stability because a newly produced ground contact point “d” is positioned backward from the point “cc'” thereby a spacious triangle is produced by the ground contact points “a”, “b”, and “d”. Likewise, a good stability is obtained, when the first and the second flat plate-like members are brought into a double-spread state, by adjusting the border line of the both members or its extended line so as to intersect with the ground contact surface within the region of a polygon on the ground contact surface formed by the above described ground contact parts (in FIG. 2(B), the triangle “abd”).

In this embodiment, the bottom-side of the connection part 8 may cross the line longitudinally passing through the center of the connection part 10 at a right angle. It may be possible that it is slightly cut in the direction of the line passing through the center of the connection part so that the angle constituted with this line 10 is a obtuse angle, and the surface of the completed connection part is a substantially obtuse triangle. By doing so, the ground contact points of “a”, “b”, “cc'”, and “d” are obtained and the stability of the article when being self-stood becomes more stable.

In an embodiment similar to those described above, a development view of a flat exhibited article (i.e., a plan view of a flat plate-like material; FIG. 3(A)); a front view (FIG. 3(B)) and a rear view (FIG. 3(C)) in a double-spread state; a perspective view in a double-folded closed state (FIG. 3(D)), of the embodiment in which a slit is produced at the upper portion 5 above the connection part, before or after the formation of the connection part or simultaneously with the formation of the connection part, and the first and the second members are separated at the portion, are shown.

An embodiment having three or more flat plate-like members, for example, an embodiment having many pages like a book, may be produced basically in the same manner as described above. Alternatively, it may be produced by preparing a book-like article in which three or more flat plate-like members have been bound with a binding part so as to be able to double-spread, and forming a part including the binding part into the connection part having a substantially triangle surface having the bottom-side which can contact with a ground. Further, it is also possible to bind flat plate-like members into a book-like structure by a conventional method such as saddle stitching and stapling near a side, separating the book-like article at the upper portion above the binding part, and pressing the lower part of the binding part to produce the connection part of a substantially triangle shape.

Examples of embodiments of the present invention are specifically explained below.

EXAMPLES

Example 1

Greeting Card

A greeting card can be produced by printing or handwriting a message or a drawing on the exhibited surface (or by leaving it blank) in the flat exhibited article of the present invention in an embodiment as shown in FIGS. 1-3 and explained as above.

Example 2

Book

Embodiments of books produced by binding three or more flat plate-like members to form the connection part are shown in FIG. 4. FIGS. 4(A) and (B) shows a type without a slit above the connection part, whereas panels (C) and (D) shows a type with a slit. FIGS. 4(A) and (C), and FIGS. 4(B) and (D) are perspective views and rear views of such book-type flat exhibited articles.

Example 3

Photo Frame

As an embodiment of the flat exhibiting device of the present invention, an example of photo frames is shown in FIG. 5 (A) and FIG. 5(B). FIG. 5(A) is a perspective view of a photo frame in a double-spread state. It is constituted to have window parts 11 on the exhibited surfaces so that photographs can be observed from the window parts 11 when the photographs are inserted into the flat plate-like members 2 and 3. Except that the flat plate-like members are constituted like this, the method for manufacturing is basically similar to that of the greeting card. FIG. 5(B) is a rear view in a double-spread state.

Examples 4-6

Decorator Articles

An example of a heart-shaped decorator or memo card (Example 4) is shown in FIG. 6. FIG. 6 (A) is a plan view of a piece of paper as the material, which is folded in half along the line longitudinally passing through the center of the connection part 10, and on which the outline of the article is drawn. The shape is excised as drawn on the paper and the connection part 4 is adhered to complete the article. Incidentally, in this figure the right side is the folded portion (a loop) and there the connection part 4 is contiguous. FIG. 6 (B) is a perspective view when the decorator or memo card of this embodiment is stood in a double-spread state.

Similarly, FIG. 7 and FIG. 8 show examples of flat exhibited articles of a butterfly-shape (Example 5) and a bird-shape (Example 6), respectively.

In these embodiments, not only the insides of the flat plate-like members but also the outsides may be used as the exhibited surfaces.

Example 7

Display for Explaining a Commercial Product

An example of a bottle-shaped display for explanation of a commercial product similar to Examples 4-6 is shown in FIG. 9. When using as a display for explanation of a commercial product, the article of the present invention is convenient from the safety view point since it is hardly turned over even if it is large. Besides it is easy to observe, thus it is advantageous for exhibition in stores. FIG. 9 (A) is a design in a state of double-folded state relative to the line passing longitudinally the center of the connection part, similar to those in FIGS. 6-8, and FIG. 9 (B) is a perspective view when the display of this embodiment is stood in a double-spread state.

Example 8

Mat Board for a Menu Sheet having Two Connection Parts

FIG. 11 shows an example of a mat board for holding and exhibiting a menu sheet in a restaurant. FIG. 11 (A) is a plan view of the flat plate-like material. An almost oblong rectangular cardboard is sectionalized into the first member 2, the second member 3, and the connection parts 4, and a cut is made at the portion above the connection part 5. The line longitudinally passing through the center of the connection part 10 is present for each of the two connection parts. These lines are folded to make valley folds, whereas the line in the middle of the both connection parts 10', and the border lines of the flat plate-like members and the connection parts 9 and 9' are folded to make mountain folds. The mat board is completed by adhering the portions of the connection parts 4 which are positioned inside as a result of the folding. The mat board can be used with a menu sheet or sheets put on the flat plate-like member(s) insides the double-spread 2 and 3. FIG. 11 (B) shows a rear view in a double-spread state.

Example 9

Desktop Display Board Which Can Exhibit a Product Sample

FIG. 12 shows an example of a desktop display board for exhibiting a sample of cosmetics and the like at a store counter. FIG. 12 (A) is a plan view of the flat plate-like material. An almost oblong rectangular cardboard is sectionalized into the first member 2, the second member 3, and the connection part 4, and a cut is made at the position above the connection part 5. Further, tongue-like parts are formed by making cuts which are axisymmetric relative to the border lines 5, 9, and 9' (indicated by broken lines) on the first member 2 and the second member 3. In this example, the tongue-like parts 12 are formed on both of the first and second members 2 and 3. It is, however, also possible to form it on only one of the members and form a slit (opening) at the corresponding position of the other member to receive the tongue-like part when it is folded inwardly. The second member contiguously has a ground contact member 13 with a flap part 16 of the same material.

The connection part is formed and each of the tongue-like parts is folded inside of the double-spread almost horizontally to form a part serving as a platform for putting a sample product. If necessary, the overlapping portions of the two tongue-like parts may be adhered each other. Further, the ground contact member is spread to reach the bottom-side of the first member, and the flap part is folded back and adhered at the back of the first member to fix a double-spread state. By doing so, the display board can be exhibited always at a predetermined angle in a double-spread state. A perspective view of the completed state is shown in FIG. 12 (B).

Example 10

Display Board with the Connection Part Fixed by Nipping

FIGS. 13 and 14 show an example of desktop display board having a completed form basically similar to that of Example 9, but using a nipping member of the type which nips from the front and having no tongue-like part. FIG. 13 (A) is a plan view of the body of the flat plate-like material. It is similar to that of Example 9 (FIG. 12 (A)), but the first member 2 and the second member 3 have slits (openings) 15 for inserting the leg parts 14-2 of the nipping member 14, instead of cuts in the tongue-like parts. FIG. 13 (B) is a plan view of the nipping member 14. The portion marked "a" positioned front (i.e., inside of the double spread) when assembled is approximately a fan-shape and has projections (i.e., insertion parts 14-3) for being inserted into the slits 15 of the body. Further, the rear portion marked "b" has two leg parts 14-2, so that the connection part is to be nipped by the vacancy (i.e., nipping part 14-1) between them.

The nipping member 14 is inserted into the slits 15 from the front to form the connection part, and the ground contact member is extended to reach the bottom-side of the first member followed by folding and adhering the flap part at the back of the first member, thereby fixing the display board in a double-spread state. The front portion of the nipping member serves as a platform for loading a sample product. A front view (FIG. 14 (A)) and a rear view (FIG. 14 (B)) of the completed state are shown.

Example 11

Display Board with a Separated Ground Contact Member

FIGS. 15 to 17 show an example of another embodiment of desktop display board. FIG. 15 (A) is a plan view of the body of the flat plate-like material. The first member 2 and the second member 3 have a set of slits (openings) 15 for inserting the nipping member 14 and another set of slits (openings) 15 for inserting the ground contact member. FIG. 15 (B) is a plan view of the ground contact member 13. The holes 15 are decorative, too, and a sample product(s) may be put into the hole(s). FIG. 15 (C) is a plan view of the nipping member 14. The nipping member 14 and the ground contact member 13 are both approximately fan-shaped in the portions marked "a" and "a'" positioned front (i.e., inside of the double spread) when assembled, and have projections (i.e., insertion parts 14-3) for being inserted into the slits 15 of the body. The rear portions marked "b" and "b'" have two leg parts 14-2 and the vacancy (i.e., nipping part 14-1) by which the connection part is to be nipped. Accordingly, the ground contact member in this example serves as a nipping member, too.

The nipping member 14 and the ground contact member 13 are respectively inserted into the slits 15 from the front, thereby the body is fixed at a predetermined angle in a double-spread state. The nipping member is approximately horizontal, and the front portion of the nipping member may function as a platform for loading a sample product. On the other hand, the ground contact member is gently sloping down toward the front where it contacts with the ground. A perspective view (FIG. 16 (A)) and a rear view (FIG. 16 (B)) of the completed state are shown. Further, for illustrating the slope of the ground contact member, in FIG. 17 a sectional view when cut at the line I-I in panel (A) is shown in panel (B).

Example 12

Display Board having Contiguous Ground Contact Member and Nipping Member

FIGS. 18 and 19 show an example of desktop display board having a completed form basically similar to that of Example 10, but having the ground contact member and the nipping member composed of a contiguous sheet. FIG. 18 is a plan view of the body of the flat plate-like material. It is similar to that of Example 10 (FIG. 13 (A)), but the first member 2 and the second member 3 have slits (openings) 15 at the both sides of the connection part in two rows for inserting the nipping member 14, and have notches (gains) 18 for inserting the anchor parts 19 of the nipping member at the lower portions of the outsides. From the bottom portion of the second member, the ground contact member 13 followed by the nipping member 14 is continued. The nipping member has, in addition to the nipping part, the anchor parts 19 which engages with the notch parts 18 of the first and second members to fix them. Further, it has a large circular hole 15 in the center portion.

The nipping part of the nipping member 14 is inserted into the slits 15 located on the both sides of the connection part of the first and second members from the front to form the connection part, and the ground contact member is extended to reach the bottom-side of the first member followed by folding and adhering or bonding the flap part at the back of the first member, thereby fixing the display board in a double-spread state. In the meantime, the anchor parts 19 of the nipping member are fixed by inserting them in the notches 18 of the first and second member.

The front portion of the nipping member is sloping up toward the back and the angle of the slope may be selected by inserting the nipping member into either the upper row or lower row of the slits. Further, by putting a sample product in the hole 15 of the nipping member, the ground contact member serves as a platform for loading the sample and the nipping member serves to make the sample more attractive. A front view (FIG. 19 (A)), a rear-perspective view (FIG. 19 (B)), and a side-perspective view (FIG. 19 (C)) of the completed state are shown.

The flat plate-like article of the present invention in various embodiments as described above are all such that the border line of the first and the second members leans backward (FIG. 10 (A), line "ab") in a double-spread state, thereby having the effects of the exhibited surface(s) being positioned diagonally upward relative to a ground contact surface (FIG. 10 (B), the angle "a" being more than 90 degrees) to enable an easily observable and effective exhibition and to improve the stability.

This application is based on the Japanese patent applications No. 2005-219909 filed Jul. 29, 2005 and No. 2005-306845 filed Oct. 21, 2005, and all of the contents described in the Specifications and Claims of the Japanese patent applications No. 2005-219909 and No. 2005-306845 are included herein.

The invention claimed is:

1. A flat plate-like article comprising two or more flat plate-like members and one or more connection parts, wherein a first plate-like member and a second flat plate-like member are connected to each other through a connection part, which is positioned on a border line of the first and second flat plate-like members and projected backward from the border line so that the first and second flat plate-like members can be double-spread, wherein a front edge of the connection part located at the border line does not parallel a back edge of the connection part located opposite the front edge, and the front edge is longer than the back edge; and wherein the flat plate-like article can stand on a support surface when the first and second flat plate-like members are brought into a double-spread state, in which at least a part of the bottom-side of the connection part, at least a part of the bottom-side of the first flat plate-like member, and at least a part of the bottom-side of the second flat plate-like member function as contact parts to define a contact plane for contacting the support surface, wherein, in the double-spread state, the inside surfaces of the first and second flat plate-like members each face upward to form an angle greater than 90 degrees with the contact plane, while the outside surfaces of the first and second flat plate-like members each face downward to form an angle smaller than 90 degrees with the contact plane.

2. The flat plate-like article according to the claim 1, wherein the border line of said both members leans backward relative to the contact plane when the first and second flat plate-like members are brought into the double-spread state.

3. The flat plate-like article according to the claim 1, wherein the border line of said both members or the extended line thereof intersects a polygonal region on the contact plane defined by the contact parts when the first and second flat plate-like members are brought into the double-spread state.

4. The flat plate-like article according to the claim 1, wherein the number of flat plate-like members is three or more.

5. The flat plate-like article according to the claim 1, wherein the number of connection parts is two or more.

6. The flat plate-like article according to the claim 1, wherein the connection part is a member having a substantially triangle shape.

7. The flat plate-like article according to the claim 1, wherein the connection part is a member having a substantially right triangle or obtuse triangle shape wherein the hypotenuse is the border line of said both members where they meet the connection part.

8. The flat plate-like article according to the claim 1, wherein the first and second flat plate-like members are separated from each other above the connection part.

9. The flat plate-like article according to the claim 1, wherein at least one of the first and second flat plate-like members has a tongue-like part which can be projected from the first and/or second flat plate-like member when the first and second flat plate-like members are brought into the double-spread state.

10. The flat plate-like article according to the claim 9, wherein the tongue-like part can be projected inward in the double-spread state.

11. The flat plate-like article according to the claim 9, wherein the tongue-like part can be projected at an angle of 0 to 45 degrees relative to the contact plane.

12. The flat plate-like article according to the claim 1, wherein the flat plate-like article further has a ground contact member which can cover at least a part of the support surface inside of the first and second flat plate-like members when the first and second flat plate-like members are brought into the double-spread state.

13. The flat plate-Like article according to the claim 1, wherein the flat plate-like article is a flat exhibited article selected from the group consisting of a greeting card, postcard, letter paper, telegram, diploma, memo pad, photograph, drawing paper, menu sheet, list of prices, pamphlet, notebook, card or book showing a cooking recipe, photograph, illustration and so on, tabletop calendar, display board, a flat exhibiting device for holding and exhibiting a flat exhibit article.

14. The flat plate-like article according to the claim 1, wherein the first flat plate-like member, the connection part and the second flat plate-like member are formed from a piece of a flat plate-like material.

15. A method for exhibiting a flat plate-like article, comprising:

bringing the flat plate-like article comprising two or more flat plate-like members and one or more connection parts, said flat plate-like article being characterized in that a first flat plate-like member and a second flat plate-like member are connected to each other through a connection part which is positioned on the border line of the first and second flat plate-like members and projected backward from the border line so that the first and second flat plate-like members can be double-spread, into a self-standing double-spread state, in which at least a part of the bottom-side of the connection part, at least a part of the bottom-side of the first flat plate-like member, and at least a part of the bottom-side of the second flat plate-like member function as contact parts to define a contact plane, wherein a front edge of the connection part located at the border line does not parallel a back edge of the connection part located opposite the front edge, and the front edge is longer than the back edge; and exhibiting the flat plate-like article in the double-spread state with the contact plane resting on a support surface such that the inside surfaces of the first and second flat plate-like members each face upward to form an angle greater than 90 degrees with the contact plane, while the outside surfaces of the first and second flat plate-like members each face downward to form an angle smaller than 90 degrees with the contact plane.

16. A flat plate-like material for producing the flat plate-like article according to the claim 1, wherein:

(1) the flat plate-like material has been sectionalized into regions of the first flat plate-like member, the connection part, and the second flat plate-like member so that these regions are arranged in this order, and (2) the region of the connection part can be folded back along a line longitudinally passing through the center of the connection part so that the border line with the region of the first flat plate-like member and the border line with the region of the second flat plate-like member are brought together, to form the connection part having the bottom-side which can contact the support surface.

17. The flat plate-like material according to the claim 16, having a printable surface on at least one side of the material.

18. The flat plate-like material according to the claim 17, wherein the flat plate-like material comprises a layer of a tacky agent or an adhesive agent under a layer of the printable surface in at least the region of the connection part, and the connection part can be formed by removing the layer of the printable surface in the region of the connection part followed by adhering or bonding both sides of the line passing through the center of the connection part by means of the layer of the tacky agent or adhesive agent.

19. The flat plate-like material according to the claim 16, wherein the flat plate-like material has a means for separating above the connection part on the straight line passing longitudinally through the center of the connection part.

* * * * *